US012130715B2

(12) United States Patent
Henspeter et al.

(10) Patent No.: US 12,130,715 B2
(45) Date of Patent: Oct. 29, 2024

(54) ADAPTIVE SPARE STAGES IN CONFIGURABLE VRM CARD

(71) Applicant: INTERNATIONAL BUSINESS MACHINES CORPORATION, Armonk, NY (US)

(72) Inventors: Justin Henspeter, Kasson, MN (US); Michael Lee Miller, Rochester, MN (US); Eric B. Swenson, Pine Island, MN (US); Jordan Keuseman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 17/953,477

(22) Filed: Sep. 27, 2022

(65) Prior Publication Data

US 2024/0103549 A1 Mar. 28, 2024

(51) Int. Cl.
*G06F 11/20* (2006.01)
*G06F 1/26* (2006.01)
*G06F 1/30* (2006.01)

(52) U.S. Cl.
CPC .......... *G06F 11/2015* (2013.01); *G06F 1/263* (2013.01); *G06F 1/30* (2013.01)

(58) Field of Classification Search
CPC ......... G06F 11/2015; G06F 1/263; G06F 1/30
See application file for complete search history.

(56) References Cited

U.S. PATENT DOCUMENTS

| | | | |
|---|---|---|---|
| 6,255,801 B1* | 7/2001 | Chalasani | G01R 31/392 320/132 |
| 6,297,972 B1* | 10/2001 | Chen | H02J 9/062 307/64 |
| 6,836,100 B2 | 12/2004 | Egan et al. | |
| 7,278,853 B1* | 10/2007 | Brodsky | H05K 3/366 439/60 |
| 8,737,103 B2 | 5/2014 | Kieferrndorf et al. | |
| 9,742,198 B2 | 8/2017 | Barus et al. | |
| 10,566,903 B1 | 2/2020 | Miller et al. | |
| 10,606,295 B1 | 3/2020 | Miller et al. | |
| 10,615,691 B1 | 4/2020 | Miller et al. | |
| 10,739,803 B1 | 8/2020 | Miller et al. | |
| 10,833,577 B2 | 11/2020 | Upadhyaya | |
| 2006/0002161 A1* | 1/2006 | Dangelo | G01R 31/2879 363/147 |

(Continued)

OTHER PUBLICATIONS

Aleksi et al., "Syncronization of the Configuration of Frequency Converters," IP.Com., An IP.com Prior Art Database Technical Disclosure, IP.com No. IPCOM000251671D, IP.com Electronic Publication Date: Nov. 22, 2017, 6 pages.

(Continued)

*Primary Examiner* — Faisal M Zaman
(74) *Attorney, Agent, or Firm* — Peter J. Edwards

(57) ABSTRACT

A discrete VRM card includes a first VRM controller and a second VRM controller. The discrete VRM card also includes a first primary power stage, a second primary power stage, and an adaptable spare stage. The discrete VRM card includes a first switch and a second switch. Closing the first switch connects the adaptable spare converter with an output of the first primary power stage. Closing the second switch connects the adaptable spare converter an output of the second primary power stage.

20 Claims, 9 Drawing Sheets

(56) References Cited

U.S. PATENT DOCUMENTS

| | | | | |
|---|---|---|---|---|
| 2009/0313485 | A1* | 12/2009 | Huang | G06F 1/26 713/300 |
| 2011/0051479 | A1* | 3/2011 | Breen | H02M 3/1584 363/148 |
| 2015/0301124 | A1* | 10/2015 | Bulur | G01R 31/52 324/754.03 |
| 2016/0179179 | A1* | 6/2016 | An | G06F 1/263 345/212 |
| 2019/0341804 | A1* | 11/2019 | Coleman | G06F 1/263 |
| 2022/0187888 | A1* | 6/2022 | Henspeter | G06F 1/26 |
| 2022/0190705 | A1* | 6/2022 | Miller | G06F 1/28 |
| 2024/0036624 | A1* | 2/2024 | Shaw | H03M 7/02 |
| 2024/0097484 | A1* | 3/2024 | Sularea | G06F 1/30 |

OTHER PUBLICATIONS

Esa-Kai et al., "Converter System Structure," IP.Com, An IP.com Prior Art Database Technical Disclosure, IP.com No. IPCOM000257212D, IP.com Electronic Publication Date: Jan. 22, 2019, 14 pages.

Anonymous, "Fail-In-Place Power Supply for High-Density Servers," IP.Com, An IP.com Prior Art Database Technical Disclosure, IP.com No. IPCOM000261948D, IP.com Electronic Publication Date: Apr. 20, 2020, 5 pages.

Sunderland, "Designing Electronic Systems for Space," Boeing, IEEE Solid-State Circuits Society (Denver), Jul. 23, 2009, 42 pages.

Ertugrul et al., "Fault tolerant motor drive system with redundancy for critical applications," Research Gate, Power Electronics Specialists Conference, Feb. 2002, 8 pages, https://www.researchgate.net/publication/3960348.

Tu et al., "Reliability and Cost based Redundancy Design for Modular Multilevel Converter," Research Gate, IEEE Transactions on Industrial Electronics, Jan. 2018, 11 pages.

\* cited by examiner ary. If the current required by the consuming component suddenly increases or decreases. In these VRMs, a single

ADAPTIVE SPARE STAGES IN CONFIGURABLE VRM CARD

BACKGROUND

The present disclosure relates to voltage regulation modules, and more specifically, to pluggable voltage regulation module cards.

Voltage regulation modules (sometimes referred to herein as "VRMs") are used in many electronics systems to provide voltage and current to various electronics components according to the requirements of those components. VRMs typically are composed of at least one semiconductor switch (e.g., a MOSFET switch) and at least one inductor (sometimes referred to as a "choke"). Some VRMs also include capacitors located near the inductors or near the components to which the VRMs are delivering power. The VRM components that together provide voltage and current (e.g., a MOSFET switch and inductor pair) are often referred to collectively as a "power stage." These VRM components are often controlled by a circuit referred to as controller (sometimes referred to as a "VRM controller").

The VRM controller is used to control the components of the VRM to provide delivery of current at a given voltage. When a VRM controller closes a semiconductor switch (i.e., turning on the power stage), for example, current flows through the VRM. The inductor of the VRM slows the change in voltage at the VRM output as a result of this current, preventing unwanted voltage spikes or drops in the power delivered to the system components. Some VRMs also include capacitors, which can smooth out the power output by the VRM, preventing "ripples" in the voltage that can be caused by, for example, conversion between multiple voltages or by electronic noise in the system.

Some VRMs support multiple groups of power stages that can be combined into a single VRM output. These groups can be controlled by the VRM controller to operate as a system that provides one voltage output.

SUMMARY

Some embodiments of the present disclosure can be illustrated as a discrete VRM card. The discrete card comprises a first VRM controller and a second VRM controller. The discrete VRM card also comprises a first primary power stage and a second primary power stage. The discrete VRM card also comprises an adaptable spare power stage. The discrete VRM card also comprises a first switch. Closing the first switch connects the adaptable spare converter with an output of the first primary power stage. The discrete VRM card also comprises a second switch. Closing the second switch connects the adaptable spare converter an output of the second primary power stage.

Some embodiments of the present disclosure can also be illustrated as a method of operating a discrete VRM card. The method comprises detecting that the VRM card has been connected to an external system. The method also comprises detecting a power property of the external system. The method also comprises identifying a VRM card configuration based on the power property. The method also comprises sending VRM instructions to a set of VRM controllers on the VRM card. The method also comprises sending multiplexing instructions to multiplexer circuitry on the VRM card. The method also comprises operating the VRM card according to the VRM instructions and multiplexing instructions.

Some embodiments of the present disclosure can also be illustrated as a VRM system that comprises control-logic circuitry. The control-logic circuitry is configured to perform the above-summarized method of operating a discrete VRM card.

DETAILED DESCRIPTION

Figure 1A:
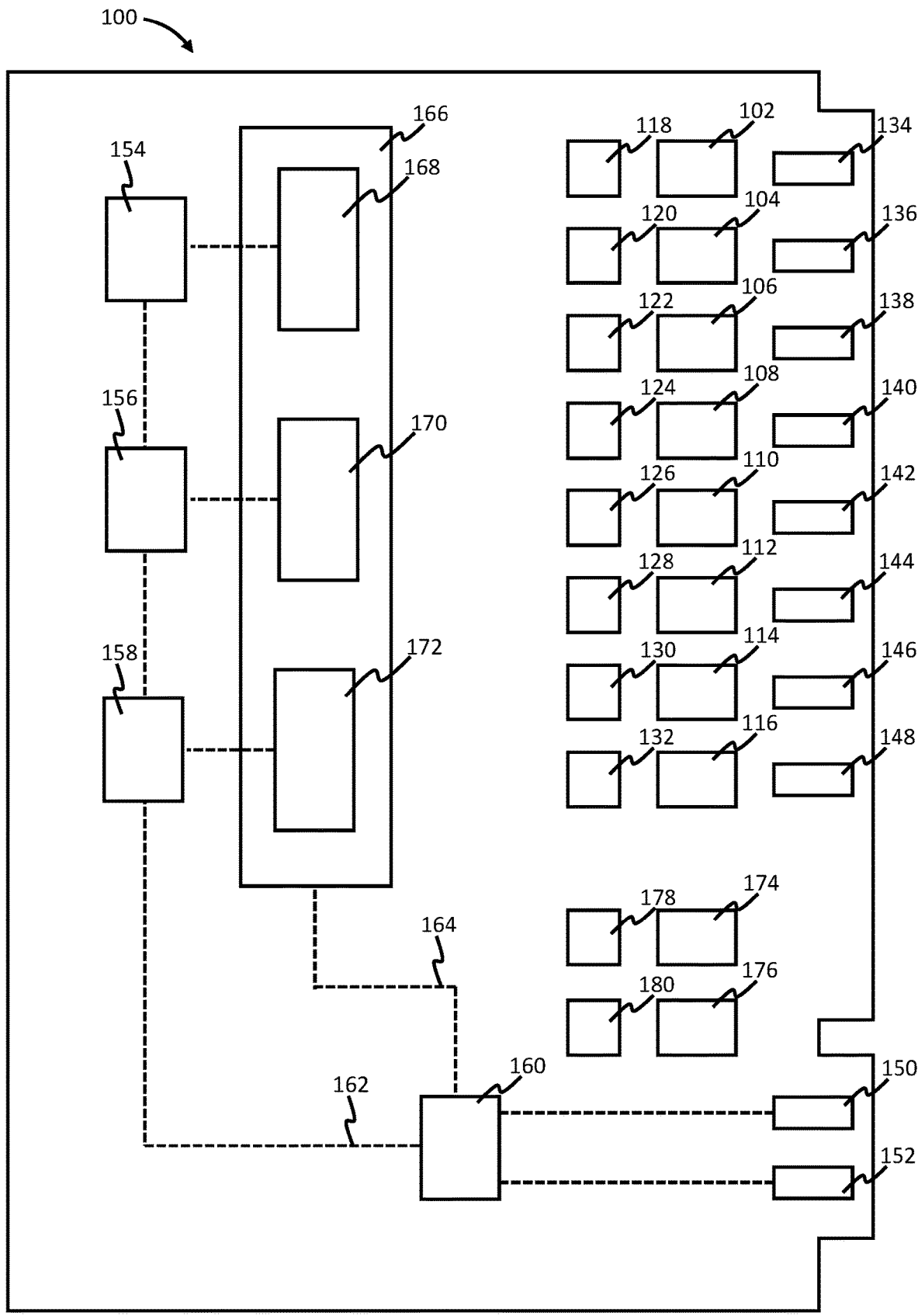
FIG. 1A depicts a first view of a configurable discrete VRM card before being attached to a system, in accordance with embodiments of the present disclosure.

Aspects of the present disclosure relate to voltage regulation modules, and more specifically, to pluggable voltage regulation module cards. While the present disclosure is not necessarily limited to such applications, various aspects of the disclosure may be appreciated through a discussion of various examples using this context.

Typical computer systems make use of voltage regulation modules (sometimes referred to herein as "VRMs") to manage the delivery of power to the various components of the computer system within the specifications of those components. For example, a computer system with a 12V power supply may include a first VRM that is responsible for converting the system's 12V power to 3V for the system processor and a second VRM that is responsible for converting the system's 12V power to 1.2V for the system memory. A typical VRM includes an inductor (sometimes referred to as a "choke"), which not only can be used to step the voltage down to the desired level, but is also often responsible for preventing abrupt changes in the output voltage. VRMs also often include a capacitor that is fed by the inductor. The capacitor may be used to filter out ripples in the output power, and to avoid voltage drops or surges when the current required by the consuming component suddenly increases or decreases. In these VRMs, a single capacitor or group of capacitors may be shared by the inductors of the VRM, or each inductor may have its own dedicated capacitance. The inductor of a VRM is typically fed by a semiconductor switch (e.g., a MOSFET switch) that allows current to flow to the inductor when the switch is closed. The VRM components that switch and step down voltage may be referred to herein as "power stages." Typically power stages contain a pair of switches, an associated inductor, drivers, telemetry, and fault protection.

VRMs often include a controller that adjusts the setting of the power stage based on the VRM output and the needs of the consuming component. For example, a VRM controller (also referred to herein as a "VRM controller") may open and close the switch of a power stage to increase and decrease the voltage output by the VRM. When such a VRM controller closes a power stage's semiconductor switch, for example, power is provided to the inductor, causing the inductor to charge. As the inductor charges, the voltage output by the inductor (and thus the voltage output by the VRM) increases. If the VRM controller is targeting an output voltage of 1.4V for a memory module, for example, it may close the switch when the VRM controller detects that the VRM is outputting 1.398V and allow the inductor to charge. When the VRM controller detects that the VRM output has increased to 1.402V, however, it may open the switch, shutting off the power to the inductor (i.e., shutting off the power stage). By quickly varying the state of the power stage, sometimes at a regular pattern referred to as a "duty cycle," the VRM controller can increase the likelihood that the VRM is providing output of a voltage that is within the specification of the computer-system components.

In typical VRMs, a VRM controller detects the properties of the voltage output by the VRM with a feedback loop. With a feedback loop, the VRM can monitor, for example, the voltage that is being provided to the system components and quickly react if circumstances cause the output voltage being to rise or drop higher or below component requirements. For example, if a change in processor workload causes a sudden increase in the current drawn by the processor, the output voltage of the VRM may drop to dangerously low levels. Using the VRM feedback loop, the VRM controller should be able to detect this drop in voltage almost instantly, enabling the VRM to react quickly (e.g., to increase the duty cycle of a power stage).

As a result of this on-off nature of VRM power cycling, the actual voltage of the output of a VRM inductor often resembles an oscillating wave centered around a target voltage. The size of this wave (i.e. the typical high and low deviations from the target voltage that are output by the inductor) can depend on the requirements of the components to which the output is being provided. For particularly sensitive components, only small deviations may be acceptable in order to maximize system performance or avoid system instability. Thus, in the above example, instead of outputting between 1.398V and 1.402V, a VRM that is powering a memory module in a high-performance server may be required to output voltage between 1.3999V and 1.4001V.

Similarly, some systems may typically involve very fast changes in current drawn by a component, which may result in significant sudden changes in a VRM's output voltage. For example, a graphics processing unit (sometimes referred to herein as a "GPU") may alternate between requiring a very small amount of current to a comparatively very large amount of current, and back to a comparatively very small amount of current. If this GPU is also sensitive to changes in voltage above a reasonable threshold, the GPU may require that the VRM be able to react very quickly to these voltage changes. However, the rate at which the VRM can respond is limited to the power stage effective inductance.

In these situations, a VRM that is relying on a single power stage may not result in sufficient performance or reliability and additional parallel power stages can be employed to improve the response. In these VRMs, each power stage may be independently controlled by the VRM controller and may be referred to as an independent "power stage." These power stages sometimes each include a dedicated capacitor to, for example, eliminate voltage ripple of the output. On the other hand, these power stages sometimes share a common source of capacitance (e.g., a capacitor or set of capacitors that is shared among all power stages of a given output).

For example, a system processor may run with acceptable stability in a voltage range of 2.7V to 3.3V, but may achieve the maximum performance between 3.298V and 3.300V. In order to provide power to the processor within this maximum-performance range, a VRM with a single power stage may be insufficient, causing even small variations in the output provided by the VRM or requested by the processor to potentially increase above the 3.3V stability limit, requiring the processor to shut down. However, a VRM with, for example, four power stages may be capable of providing power within the maximum-performance range.

In a typical VRM with multiple power stages, the VRM controller sets the duty cycle of each power stage to cause the overall output of the VRM to comply with the requirements of the system component to which the VRM is providing power. For example, in a VRM with two power stages, the VRM may drive the power stages out of phase with respect to each other. In other words, the VRM may close the semiconductor switch of the first power stage in a periodic pattern and close the semiconductor switch of the second power stage in an offset periodic pattern, such that the two power stages alternate.

In some computer systems, each electrical component (or component subsystem) may have a dedicated VRM. For example, in some systems, a first VRM may provide power to a first processor die, a second VRM may provide power to a second processor die, and a third VRM may provide power to a system memory. In this example system, each VRM may have its own set of power stages and its own VRM controller. However, in some computer systems, multiple sets of power stages can share a single VRM controller. For example, a processor die may be provided power by a first set of power stages and the system memory may be provided power by a second set of power stages. However, these two sets of power stages may each be controlled by a single VRM controller.

In a system in which a single VRM controller manages more than one set of power stages for more than one system component (i.e., more than one output), the VRM controller typically must be able to independently monitor and react to the properties of the voltage output to each component. As such, these VRM controllers typically incorporate multiple feedback loops. A first set of power stages, for example, could be connected to a first feedback loop, and a second set of power stages could be connected to a second feedback loop. Even though these sets of power stages would independently power outputs and be independently monitored by independent feedback loops, a single VRM controller could control each set of power stages, and thus they may be referred to herein and belonging to the same VRM.

For the sake of simplicity, when such examples of multiple sets of power stages are providing power to multiple outputs, these sets of power stages are typically referred to herein as controlled by multiple VRM controllers. However, this should be interpreted to describe either the situation in which multiple VRM controllers control those sets of power stages, or the situation in which multiple feedback loops of one or more VRM controllers control those sets of power stages.

As such, for the purposes of this disclosure, discussions of a VRM controller providing instructions to and controlling a single group of stages for a single output is typically referred to as that group of stages being controlled by the VRM controller, and other groups of stages for other outputs are typically referred to as those groups of stages being controlled by other VRM controllers. However, where multiple VRM controllers are discussed as controlling multiple output groups, those output groups could, in practice, be controlled by multiple feedback loops rather than multiple VRM controllers.

In some industries and use cases within some industries, maintaining high performance of a system powered by a VRM (or set of VRMs) can be extremely important. An inability of a VRM to consistently provide output voltages within a narrow range of system requirements can, in some circumstances, require system components to be operated at lower performance levels, reducing overall system performance. Further, a temporary failure of a VRM to provide output voltage with a component's stable range may cause the component to malfunction, requiring a system restart. In either circumstance, the consequences could potentially lead to a costly reduction in system performance. Thus, in use cases in which VRMs are required to consistently operate within very specific ranges, VRMs with a high number of power stages and very reliable, high-quality components (e.g., semiconductor switches and capacitors) are often used.

However, equipping a VRM with multiple power stages that are composed of reliable, high-quality components can significantly increase the cost of the VRM. Unfortunately, this can also increase the cost of the overall computer system into which the VRM is integrated. This detriment can be exacerbated when a VRM is integrated into the system (e.g., on the system motherboard or backplane). In these systems, a failure of a non-VRM component may require replacement of a significant amount of the system, including the component onto with the VRM is integrated (e.g., the motherboard or GPU board). In these instances, an expensive VRM that is functioning perfectly within system requirements may need to be replaced. Similarly, if a component of an integrated VRM (e.g., a capacitor) begins to malfunction, replacing it may also require replacing other system components, such as an integrated, expensive, and perfectly functioning central processing unit. Over time, these incidental and unnecessary replacement costs can significantly increase the maintenance costs in use cases with multiple computer systems.

For these reasons, expensive computer systems are often designed to utilize discrete VRM cards (sometimes referred to herein as "add-in VRM cards" or simply "VRM cards") that can be attached to (and removed from) the system through a standard or proprietary socket (for example, a socket designed to accept a card-edge connector). An add-in VRM card can typically be plugged into and removed from a system if the system is not powered on. Thus, if a non-VRM component of a system fails and the system is replaced with a replacement system with identical voltage requirements, it is possible that the discrete VRM could be removed from the failed system and plugged into the replacement system. In this circumstance, the expensive VRM could be reused, potentially reducing the replacement cost (and long-term maintenance) significantly.

Unfortunately, sometimes system requirements change, and sometimes it may not be advisable, or even feasible, to replace a failed system with a replacement system whose voltage requirements are identical to the failed system's voltage requirements. For example, if a failed processor requires replacement of the system backplane (for example, if the processor package is soldered to the backplane), it may be desirable to replace the system backplane and processor with updated components (e.g., a more modem processor model) that has higher performance and efficiency. However, if both systems use a discrete VRM to power the processor, the discrete VRM that was used to power the failed processor may not meet the requirements of the updated processor.

This situation may also occur when system components are updated absent system failures. For example, high-performance use cases may operate on a regular upgrade cycle in order to maintain high performance across the system. These high-performance systems are often the same types of systems that require expensive, reliable VRMs, and thus benefit from discrete VRMs rather than integrated VRMs. Unfortunately, the requirement for modern system components may frequently result in the discrete VRM needing to be replaced when other system components are replaced, limiting the benefit derived from using a discrete VRM design.

Some embodiments of the present disclosure address the above limitations by enabling discrete VRM designs to be reconfigurable based on the requirements of the system into which they are added. For example, a discrete VRM card may configure itself to provide two outputs when plugged in to a first system. The first output may be a central processing unit that operates at 3.5V and requires 4 power stages, and the second output may be system memory that operates at 1.2V and requires 2 power stages. That same discrete VRM card may configure itself to provide three outputs, however, when plugged into a second system. The first output may be a central processing unit that operates at 4.0V and requires 6 power stages, the second output may be a graphics processing unit that operates at 1.0V and requires 4 power stages, and the third output may be system memory that operates at 1.4V and requires 2 power stages.

Some embodiments of the present disclosure may include a VRM card design that features multiple controllers. For example, a single VRM card may include three controller chips that all include two feedback loops. This would enable the single VRM card to output, if necessary, six independent power sources. As another example, a simpler VRM card may include a single controller chip with two feedback loops. This would enable the simpler VRM card to output, if necessary, two independent power sources.

Some embodiments of the present disclosure may also include multiplexer circuitry to connect the VRM controllers, or their feedback loops, to the appropriate power stages as required by the output needs of a system to which the VRM card is connected. Specifically, the multiplexer circuitry may enable each power stage to be connected to any of the loops of the VRM card, depending on the desired VRM configuration. For example, a VRM card may include 10 power stages, each of which may connect to one or more VRM controllers through the multiplexer circuitry. The multiplexer circuitry may include multiple outputs that can enable the VRM card to select the controller (or feedback loop) to which each power stage is connected. For example, if the 10-power stage VRM card also includes 2 controllers and a total of 4 feedback loops, the multiplexer circuitry may include four outputs (one for each feedback loop) for each of the 10-power stages. By selecting the first output in the multiplexer circuitry for the first 5 power stages, the first 5 power stages could be connected to the first feedback loop. In other words, the first 5 power stages would be combined into a single output power source that is controlled by the first feedback loop. Similarly, by selecting the third output for power stages 6-8, power stages would be combined into a single output power source that is controlled by the third feedback loop. Finally, by selecting the fourth output for power stages 9 and 10, power stages 9 and 10 would be combined into a single output source that is controlled by the fourth feedback loop.

Some embodiments of the present disclosure provide instructions to each VRM controller when the VRM card is plugged into a computer system. These instructions may provide information to the controller regarding the power stages that it is controlling, the default voltage level for those power stages, and the required voltage range of each output. Thus, when a VRM card is plugged into a system for which the first feedback loop is required to output a 3-power-stage signal for a set of memory, the VRM card may provide instructions to the VRM controller that inform the controller that the first feedback loop is controlling power stages 9, 10, and 11 at a particular target voltage. When the VRM card is plugged into a second system for which the first feedback loop is required to output a 10-power-stage signal for a CPU core, the VRM card may provide instructions to the VRM controller that inform the controller that the first feedback loop is controlling power stages 1-10 at a particular target voltage.

In some embodiments, these instructions to the VRM controller are provided in the form of a configuration file. For example, when plugged into a first system, the VRM card may provide instructions to a VRM controller to load a first configuration file. That first configuration file may provide the VRM controller with information that is necessary to control the power stages assigned to the VRM controller. However, when plugged into a second system, the VRM card may provide instructions to a VRM controller to load a second configuration file. The second configuration file may provide different instructions than the first configuration file based on the needs of the second system. That said, like the first configuration file, the second configuration file may provide a list of power stages that are assigned to the VRM controller's feedback loops, and the instructions necessary to control those power stages (e.g., voltage targets).

Some embodiments of the present disclosure incorporate a configuration selector. In some embodiments, the configuration selector may take the form of a resistor, pin, or simple circuit that sends a signal to the VRM controller. This signal may inform the VRM controller of the configuration file that the VRM controller should load. This configuration file may identify the power stages that are assigned to the VRM controller. With this information, the VRM controller can inform the multiplexer circuitry of the correct output to be directed to the proper feedback loop.

In some embodiments, the configuration selector may inform the multiplexer circuitry and controller(s) of what VRM card configuration is required by the system into which the VRM card is inserted. For example, a VRM card may be designed with only 2 configurations, which may be selected depending on whether the VRM card is inserted into system A or system B. When the VRM card is inserted into system A, the configuration selector may recognize a property of the system and send a signal to the VRM controller(s) and multiplexer circuitry that informs them to use the "system A configuration." However, if that same VRM card is inserted into system B, the configuration selector may recognize a property of system B and send a signal to the VRM controller(s) and multiplexer circuitry that informs them to use the "system B configuration."

The form of the configuration selector may vary based on the requirements of the implementation. For example, a discrete VRM card that is designed to only be used in a small number of systems, and thus is designed to only alternate between a small number of different configurations, a set of pins or resistors that are able to send a "high or low" signal to a VRM controller, or a short binary code based on which of those pins are set to "high" may be sufficient in some embodiments.

However, as the number of possible configurations in which the VRM card is designed to be used increases, simple configuration selector designs may become insufficient. Thus, some VRM cards incorporate configuration selectors that are more complex, such as a multiplexer, an application-specific integrated circuit (sometimes referred to as an "ASIC") or a field-programmable gate array (sometimes referred to as an "FPGA").

For example, a VRM card could incorporate an ASIC configuration selector in VRMs that are designed to switch between more configurations than would be feasible to incorporate into a set of pins. The added complexity of an ASIC could enable the VRM card to be designed for significantly more configurations. Similarly, a VRM card could incorporate an FPGA configuration selector. Similar to an ASIC, an FPGA configuration selector may be beneficial when a VRM card is designed to switch between a larger number of configurations.

Some VRM cards provide power to computer components in which the constant uptime of those components, often at very high performance (and thus, very narrow margins for the voltage supplied by the VRM card), is particularly important. For example, server systems in enterprise environments, systems in the medical field, safety systems, such as in the aircraft industry or power plants, and military systems often require near 100% uptime. In these computer systems, a failure of a VRM component (e.g., a stage or controller) could prevent the VRM card from supplying power to a component within the component's requirements. This could prevent the component from operating at sufficiently high performance, or even prevent the component from functioning at all. Similarly, computer systems in very remote locations (e.g., cell towers, research outposts, satellites in planetary orbit) require high reliability because of the difficulty of servicing failed components. Thus, in these use cases, redundant VRM components are often included in the VRM card to provide spare resources in case a primary VRM component fails. This may avoid a need to replace the VRM card in order to maintain sufficiently high performance of the overall system.

For example, a VRM card may include an output group of one VRM controller and three stages. These stages may be referred to as the output group's primary stages. To provide redundancy, the VRM card may also include a spare stage that is not needed to be connected to the VRM controller or the output of the VRM output group in normal operation. However, if one of the three primary stages fails (for example, if the capacitor of the stage fails), the VRM may isolate the failed primary stage from the VRM controller, power source and output. The VRM may then connect the spare stage to the VRM controller, power source, and output.

If these steps are performed quickly enough, the output group can provide continuous power to the respective computer-system component (e.g., CPU core), maintaining the uptime of the component. The VRM card may perform these isolating and connecting steps through a set of control logic (e.g., an application-specific integrated circuit) that controls the inputs and outputs of the output groups.

Including redundancy in a VRM can be performed in several ways. As previously discussed, redundant stages (sometimes referred to herein as "spare stages") can be included in a VRM card in a system that utilizes stage redundancy. These spare stages may be isolated in a normal mode of operation, but may be connected to the VRM controller, power source, and VRM output if a primary stage malfunctions. Further, in VRM cards with multiple outputs, it is sometimes possible for these spare stages to be connected to the output group of any of those multiple outputs. For example, a VRM card may contain two output groups: a first output group of 2 stages that outputs power to a memory module, and a second output group of 6 stages that outputs power to a microprocessor. If a stage in the first output group fails, a spare stage could be connected to the controller, power source, and output of that first output group. If a stage in the second output group fails, however, the spare stage could be connected to the controller, power source, and output of that second output group.

However, stage redundancy can have disadvantages. Typical VRMs that utilize stage redundancy, for example, feature a single VRM controller for each output group. Thus, while such designs provide redundant mechanisms to address failures of the components within a stage (i.e., a MOSFET switch, inductor, or converter), such designs do not, by themselves, offer flexibility for being configurable for a variety of systems or address a failure of the VRM controller for an output group. Further, stage-redundancy can sometimes require complicated switching circuitry to ensure that failed stages are separated from the VRM controller and that spare stages are connected to the VRM controller. These complex switching requirements can be problematic because typical computer systems that utilize redundant VRM components also require extremely high uptime, resulting in a need for a failed stage to be isolated and a spare stage to be connected in a very short amount of time.

For use cases in which extremely high uptime is important and for which stage redundancy may be overly complicated, it is possible to utilize redundant VRM controllers in addition to redundant stages. VRM-controller redundancy can be applied in high-uptime use cases by providing one or more spare VRM controllers that is paired with one or more adaptable spare stages. Due to this pairing, spare VRM controller not only provides controller redundancy in case of a failed VRM controller elsewhere on the VRM card, but also may provide faster switching times when replacing a failed stage with a paired adaptable stage.

However, controller redundancy can also have disadvantages. For example, including a VRM controller for every stage, including each spare stage, can become expensive if the VRM includes a large number of adaptable spare stages. Further, many spare VRM controllers can take up a greater amount of circuit-board space than spare stages without paired spare VRM controllers. Particularly if the number of output groups is high, this can make it difficult to design the VRM in a way that allows the VRM components to be sufficiently close to each other and sufficiently close to the power-consuming system components to avoid electrical noise from building up in the output current before delivery.

Some embodiments of the present disclosure incorporate adaptable spare stages into a VRM card design. In some embodiments of the present disclosure, these adaptable spare stages may comprise stage components (e.g., a MOSFET switch, an inductor, a capacitor) and a redundancy controller to connect the stage to or isolate the stage from a power source and the output group. These adaptable spare stages may have the capability to connect with any of the output groups in the VRM. For example, a VRM may contain three output groups (each of which may contain four primary stages) and three adaptable spare stages. Each of these spare stages may be able to connect with any of the three output groups in the VRM. Thus, if each output group experiences one primary stage failure, the VRM could replace the failed primary stage in all three output groups. Similarly, if one output group experiences three primary stage failures, the VRM could replace all three of those primary stage failures. Thus, the embodiments of the present disclosure may achieve an acceptable level of redundancy while avoiding excess expense and board space required to provide dedicated spare stages for every output group.

Some embodiments of the present disclosure may also utilize adaptable spare stages when it is detected that a computer-system component requires (or is likely to require) an amount of current that is higher than the corresponding output group is able to provide. For example, an output group of a VRM card may be capable of outputting sufficient current to a processor to fulfil the processor's average steady-state operations and typical high-workload operations. However, if an upcoming workload of that processor is predicted to temporarily require higher current than that, the output group may be unable to provide power to the processor within acceptable operating conditions (e.g., within a threshold stage efficiency for the output group, while meeting the processor's voltage requirement). In these circumstances, one or more spare stages could be connected to the output group in the same way they would be if one or more primary stages of the output group had failed. However, rather than replacing the primary stages, the spare stages would be used to increase the number of stages in the output group. For example, a 6-stage output group could be temporarily increased to an 8-stage output group, which may increase the stability of the output power at very high power requirements efficiency of delivering that output power at those very high power requirements. By using available spare stages to temporarily meet high power draw, VRMs could be designed with fewer primary stages while still meeting the demands of the system.

FIG. 1A depicts a first view of a configurable discrete VRM card 100 before being attached to a system. VRM card 100 comprises 6 primary power stages 102, 104, 106, 108, 110, 112, 114, and 116. Each of power stages 102-116 could include a power stage, inductor, and capacitor (not individually depicted). Each of power stages 102-116 are also connected to a corresponding redundancy controller from redundancy controllers 118, 120, 122, 124, 126, 128, 130, and 132. Redundancy controllers 118-132 may control the connectivity of the corresponding power stages to a power source and to the output to an attached system.

For example, redundancy controller 118 may control the state of a first switch that connects stage 102 to a power source that provides the current that stage 102 can convert and output to a connected computer system through the output of VRM card 100. Redundancy controller may also control the state of a second switch that connects stage 102 to an output through which VRM card 100 provides power to the connected computer system. These switches are not presented in FIGS. 1A-1C for the sake of avoiding an overcomplicated presentation of the embodiments of the present disclosure.

VRM card 100 may be inserted into a slot of a computer system, such as in a motherboard or a system backplane. Illustrating one example of such a connection, VRM card 100 includes a card-edge connector with conductive contacts 134, 136, 138, 140, 142, 144, 146, 148, 150, and 152 on the edge of the circuit board on which VRM card 100 is constructed. Conductive contacts 134 through 148 represent outputs for each of power stages 102 though 116. Conductive contacts 142 through 152 may act as outputs for each of power stages 102 though 152. For example, the voltage that is output by power stage 102 may be transferred to the overall computer system through a connection between conductive contact 142 and the system board. The components to which that output voltage is routed may depend upon the system configuration. For example, if power stages 102 and 104 are combined into a single output to provide voltage to a memory module, conductive contacts 142 and 144 would provide voltage to that memory through connections on the system board.

Conductive contacts 150 and 152 may act as a connection point between the system motherboard through which a system property could be transmitted from the system board to a configuration selector 160. Configuration selector 160 could, for example, take the form of a set of pins, a simple circuit, an ASIC, an FPGA, or control chip.

A system property could take various forms based on the implementation of VRM card 100. For example, if VRM card 100 is designed to operate between two configurations, the system property could take the form of a "high" or "low" value. It could also be a combination of binary values that are transmitted through a set of pins and traces, such as a set of three "high" or "low" values, resulting in 8 potential configurations (e.g., 000, 010, 100, etc.) The system property could also be a configuration number or model identifier of the computer system, which configuration selector 160 may be able to cross reference with a list of VRM configurations in an on-board memory. The form factor of the connector to the system (here, conductive contacts 150 and 152) therefore, may vary based on the type of signal being used to identify the system property. If the simple presence or absence of voltage (or a high or low voltage) at a connection is used to identify a system power property, for example, the system connector could take the form of one or more trace contacts that could transmit that voltage. If, on the other hand, the system power property is identified based on the system's serial number, or a number of outputs and voltage ranges required for those outputs, a more complex connection such as a signal connector cluster may be required.

Finally, while not illustrated herein, configuration selector 160 could identify the VRM configuration based on impedance measurements between conductive contacts 134 through 148 rather than through conductive contacts 150 or 152. For example, if power stages 102 through 106 are combined into one output (e.g., to a first processor core) and power stages 108 and 110 are combined into a second output (e.g., to a second processor core), conductive contacts 134 through 138 would be connected to a different board component than conductive contacts 140 and 142. For that reason, an impedance measurement between conductive contacts 134 through 138 (or between conductive contacts 140 through 142) would be minimal, while an impedance measurement between any of conductive contacts 134, 136, and 138 and conductive contacts 140 and 142 could be significantly larger. Thus, upon being plugged into a system board, configuration selector 160 could perform impedance measurements between various pairs of conductive contacts 134 through 148 to identify which conductive contacts are combined into outputs. Those conductive-contact combinations could then be used as a basis for identifying the power stages that should be grouped together.

VRM card comprises three VRM controllers 154, 156, and 158. Each of VRM controllers 154-156 may include one or more feedback loops. In embodiments in which each of power stags 102-116 is intended to be independently assignable to of VRM controllers 154-156 (or their feedback loops), it may be beneficial for each of conductive contacts 134 through 148 to be electrically isolated from one another. This would enable, in theory, a configuration in which power stage 102 provides a first output through conductive contact 134 and stages 104-116 all combine to provide a second output through conductive contacts 136-148. Further, by designing VRM 100 such that each of conductive contacts 134-148 are also electrically isolated from each other, every power stage could, in theory, provide a single output, similar to the example above with respect to power stage 102.

It is of note that conductive contacts 134 through 152 are example abstract representations of a method by which VRM card 100 could be inserted into and connected with a motherboard or system backplane. In other embodiments, other connection form factors, connectors, and numbers of connectors could be used.

Configuration selector 160 comprises two outputs: 162 and 164. Output 162 is designed to provide instructions to controllers 154, 156, and 158. These instructions may take various forms based on the implementation of VRM card 100. For example, if VRM card 100 is designed to use only two configurations, the instructions carried by output 162 could take the form of a "high" signal (e.g., a 5V signal, sometimes interpreted as "true" or "on") or a "low" signal (e.g., a 0V signal, sometimes interpreted as "false" or "off"). If VRM card 100 is designed to use more than two configurations, the instructions carried by output 162 could take the form of a configuration number (e.g., configuration "5") or a binary code for a configuration (e.g., "101"), which may inform VRM controllers 154, 156, and 158 which configuration file to retrieve from a memory. That configuration file may inform VRM controllers 154, 156, and 158 which power stages each of VRM controllers 154, 156, and 158 (or their feedback loops) are controlling, and what the voltage restrictions are. In some embodiments, VRM controllers 154, 156, and 158 may not be connected to a memory, in which case the instructions carried by output 162 may provide the configuration-file information.

Output 164 is designed to provide multiplexing instructions to multiplexer circuitry 166. These multiplexing instructions could take the form of a configuration number (similar to the configuration number that could be provided using output 162) or a list of connections to make within multiplexer circuitry 166. These connections may cause VRM instructions output by VRM controllers 154, 156, and 158 to their intended destination stages. For example, multiplexer circuitry 166 may contain multiplexers that enables it to group sense signals and pulse-width-modulation signals for each VRM controller 154-158 into the necessary output groups 168, 170, and 172 for the connected system and connect those output groups 168, 170, and 172 to the corresponding redundancy controllers 118 through 132 based on the needs of the connected system.

Finally, VRM card 100 also contains adaptable spare stages 174 and 176. Both of adaptable spare stages 174 and 176 may be capable of connecting to any of conductive contacts 134-148, and thus may be capable of contributing to any output of VRM card 100. Spare stages 174 and 176 may, thus, be used to contribute to an output during a detected high-load condition, or after the failure of one (or more) of stages 102-116. Thus, even if, for example, stages 108 and 116 were to fail, adaptive spare stages 174 and 176 could replace stages 108 and 116 respectively, enabling VRM card 100 to operate normally even with 2 failed primary stages.

The connectivity of adaptive spare stages 174 and 176 may be controlled by redundancy controllers 178 and 180 respectively. For example, when stage 174 is not required by a connected system, redundancy controller 178 may maintain a first switch between stage 174 and a power source in an "open" state. Further, redundancy controller 174 may also control 8 switches between adaptable spare stage 174 and the output of VRM 100. Each of these 8 switches may be used to connect stage 174 to one of conductive contacts 134-148. More information about these switches is provided in FIGS. 2A-2C.

Figure 1B:
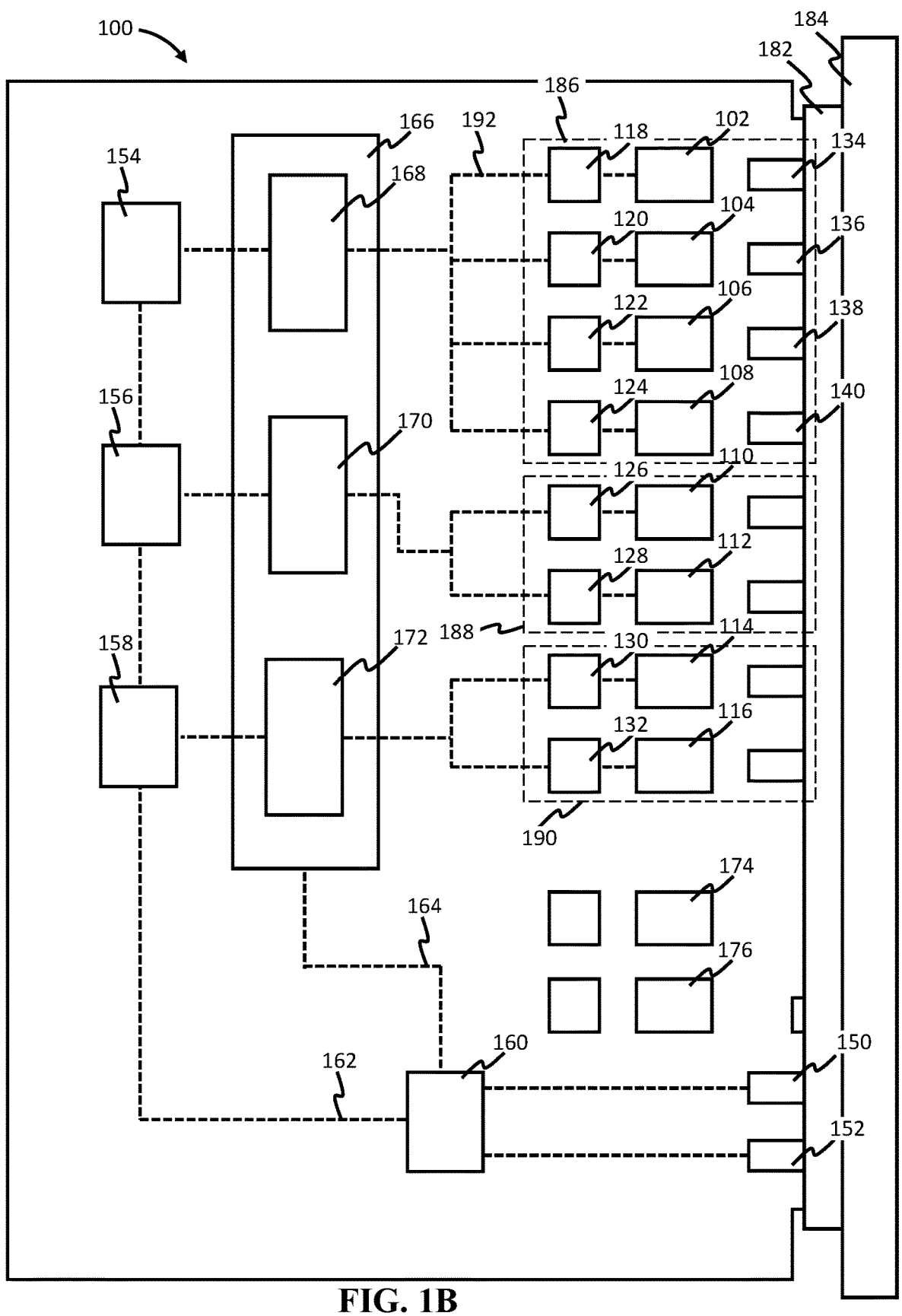
FIG. 1B depicts a second view of a configurable discrete VRM card after being attached to a first system, in accordance with embodiments of the present disclosure.

FIG. 1B depicts a second view of configurable discrete VRM 100 card after being attached to a first system. Specifically, conductive contacts 134-152 have been inserted into a slot 182 on a system board 184. Slot 182 and/or system board 184 cause a connection between conductive contacts 134-140. This effectively combines the outputs of associated stages 102-108 into a single, first output, illustrated by dashed outline 186. Similarly, stages 110 and 112 have been combined into a second output, illustrated by dashed outline 188, and stages 114 and 116 have been combined into a third output, illustrated by dashed outline 190.

Figure 1C:
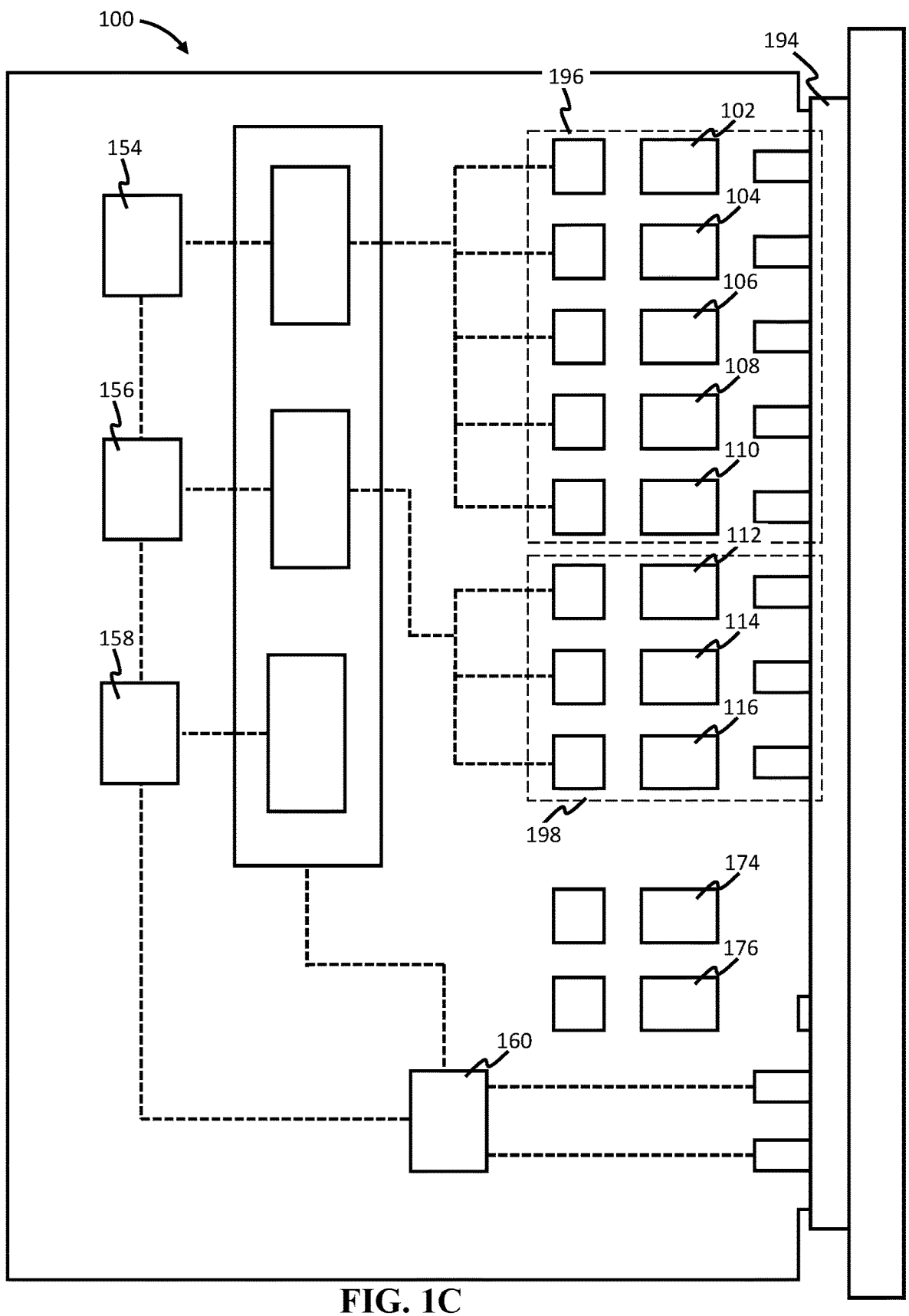
FIG. 1C depicts a third view of a configurable discrete VRM card after being attached to a second system, in accordance with embodiments of the present disclosure.

A system connector of VRM card 100, illustrated in FIGS. 1A-1C by conductive contacts 150 and 152, may also make contact with the first system through slot 182. Though this connection, the first system could transmit a system property to configuration selector 160. With this system property, configuration selector 160 may be able to identify the outputs into which stages 102-116 have been grouped, as well as other system needs (e.g., voltage target, power-stage assignments, etc.).

Configuration selector 160 could then transmit VRM instructions to VRM controllers 154-158, through output 162, based on the system property and the identified configuration into which stages 102-116 have been grouped. These VRM instructions typically could be used by VRM controllers 154-158 to determine how to operate their respective outputs, but the format of these VRM instructions may differ based on the embodiment of the VRM card. More information regarding these VRM instructions is provided in the discussion of FIG. 4.

Configuration selector could also transmit multiplexer instructions, through output 164, to multiplexer circuitry 166. These multiplexing instructions could cause multiplexer circuitry 166 to connect the outputs of VRM controllers 154 to the appropriate power stages 102-116, based on the configuration of VRM card 100 after being inserted into the first system. For example, because stages 102 through 108 have been connected together into a single output by the first system, multiplexer circuitry 166 connects output of controller 154 (e.g., switching instructions, pulse patterns) to redundancy controllers 118 through 124 and stages 102 through 108. This connection is illustrated with dashed line 192.

In other words, as a result of configuration selector identifying the system property, VRM card 100 can identify the configuration of outputs into which stages 102 through 116 have been grouped by the first system. With this information, VRM controller 154 can be configured to output instructions to a first VRM output group, and multiplexer circuitry 166 can be configured to relay those instructions to redundancy controllers 118-124 and stages 102-108. Similarly, VRM controller 156 can be configured to output instructions to a second VRM output group, and multiplexer circuitry 166 can be configured to relay those instructions to redundancy controllers 126 and 128 and to stages 110 and 112. Finally, VRM controller 158 can be configured to output instructions to a third VRM output group, and multiplexer circuitry 166 can be configured to relay those instructions to redundancy controllers 130 and 132 and to stages 114 and 116.

FIG. 1C depicts a third view of configurable discrete VRM card 100 after being attached to a second system through slot 194. This second system has different power requirements as compared to the first system, and thus stages 102-116 have only been grouped into two output groups, instead of three output groups. These output groups are illustrated by dashed lines 196 and 198.

Due to the difference in the power requirements between the first system and the second system, the system property received by configuration selector 160 is different than the system property received in FIG. 1B. As a result, configuration selector 160 has sent VRM instructions to VRM controllers 154 and 156 to configure those VRM controllers to output signals for each VRM output. VRM controller is not utilized in the VRM configuration illustrated in FIG. 1C.

Also due to the difference in system property received by configuration selector 160, configuration selector 160 has sent different multiplexing instructions to multiplexer circuitry 166. Specifically, multiplexer circuitry 166 is, as illustrated in FIG. 1C, routing instructions from VRM controller 154 to stage 110, rather than from VRM controller 156. Similarly, multiplexer circuitry 166 is routing instructions from VRM controller 156 to stages 114 and 116, rather than from VRM controller 158.

The switch between the configurations illustrated in FIGS. 1B and 1C may have occurred, for example, if the system of FIG. 1B included one processor die, one memory, and one chipset, all of which were powered by VRM card 100. The processor die, for example, may have required 4 power stages (or 3 power stages and 1 dedicated spare power stage), whereas the memory and chipset may have only required two power stages (or 1 power stage and 1 dedicated spare). The system of FIG. 1C, however, may have included a processor package with a larger processor die and more memory. In this system, larger processor die may require more power stages (e.g., 5 power stages), and the increased system memory may require more power to operate.

Of note, the configurations depicted in FIGS. 1A-1C do not explicitly illustrate the use of adaptable spare stages 174 and 176. However, there are use cases in which VRM card may utilize either or both of spare stages 174 and 176 in either the first system (illustrated in FIG. 1B) or the second system (illustrated in FIG. 1C). For example, adaptable spare stage 174 could be connected to the first output group in FIG. 1B if stage 108 fails. Similarly, adaptable spare stage 176 could be connected to the first output group in FIG. 1C if VRM card 100 or a component of the second system detects that the component to which the first output group is connected is or will experience a high load condition (e.g., a transient voltage spike due to a high CPU workload, a GPU workload that would increase the current to the extent that the stages of the first output group would be unable to provide the necessary power to the GPU without dropping below a threshold operating efficiency). In some embodiments, both of adaptable spare stages 174 and 176 could be connected to system outputs even in the absence of a system failure or high-load condition. This may be useful, for example, for further stabilizing the power delivered to system components, increasing the efficiency of the power delivered to system components, and for providing more immediate failover in the case of a failed stage. More information is provided regarding utilizing adaptable spare stages in FIGS. 2A-2C, FIG. 3, and FIG. 5.

Figure 2A:
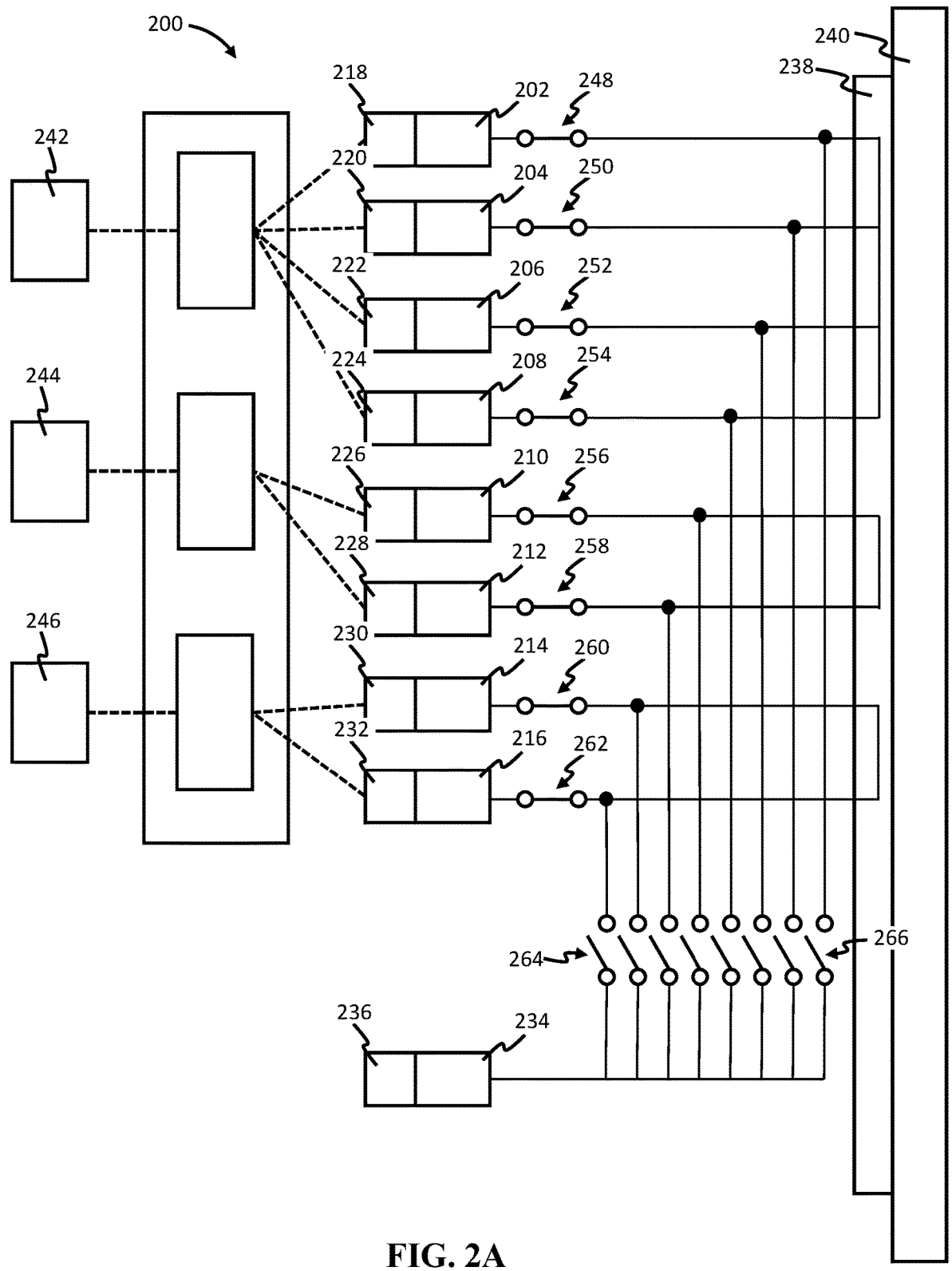
FIG. 2A depicts a first schematic view of a configurable VRM card before the detection of a high-load condition on a first output, in accordance with embodiments of the present disclosure.

FIG. 2A, for example, depicts a first schematic view of a configurable VRM card 200 before the detection of a high-load condition on a first output. VRM card 200 includes 8 primary stages 202, 204, 206, 208, 210, 212, 214, and 216, each with a corresponding redundancy controller 218, 220, 222, 224, 226, 228, 230, and 232. VRM card also includes one adaptable spare stage 234, with a corresponding redundancy controller 236.

The output power of stages 202-216 are each connected to the external system through switches 248, 250, 252, 254, 256, 258, 260, and 262 respectively. The states of switches 248-262 are controlled by redundancy controllers 218-232 respectively. For example, if stage 202 failed and needed to be isolated from the external system, redundancy controller 218 could open switch 248.

VRM card 200 has been inserted into slot 238 in system backplane 240. Slot 238 and system backplane 240 has caused the outputs of stages 202-208 to be connected into a first output group, the outputs of 210-212 to be connected in a second output group, and the outputs of 214-216 to be connected in a third output group. As such, stages 202-208, as configured in FIG. 2A, receive instructions from VRM controller 242, stages 210 and 212 receive instructions from VRM controller 244, and stages 214 and 216 receive instructions from VRM controller 246. These instructions are illustrated in FIG. 2A as dashed lines proceeding from the respective VRM controllers, through a multiplexer circuitry, and to the respective stages.

The output of adaptable spare stage 234 can be connected to the output of any of primary stages 202-216 through a set of eight switches (e.g., switch 264 and switch 266) that are controlled by redundancy controller 236. As will be discussed in FIGS. 2B and 2C, these switches could be closed in order to utilize adaptable spare stage to contribute extra power to an output with functioning stages (e.g., in a high-load condition) or to provide failover for a failed stage.

Figure 2B:
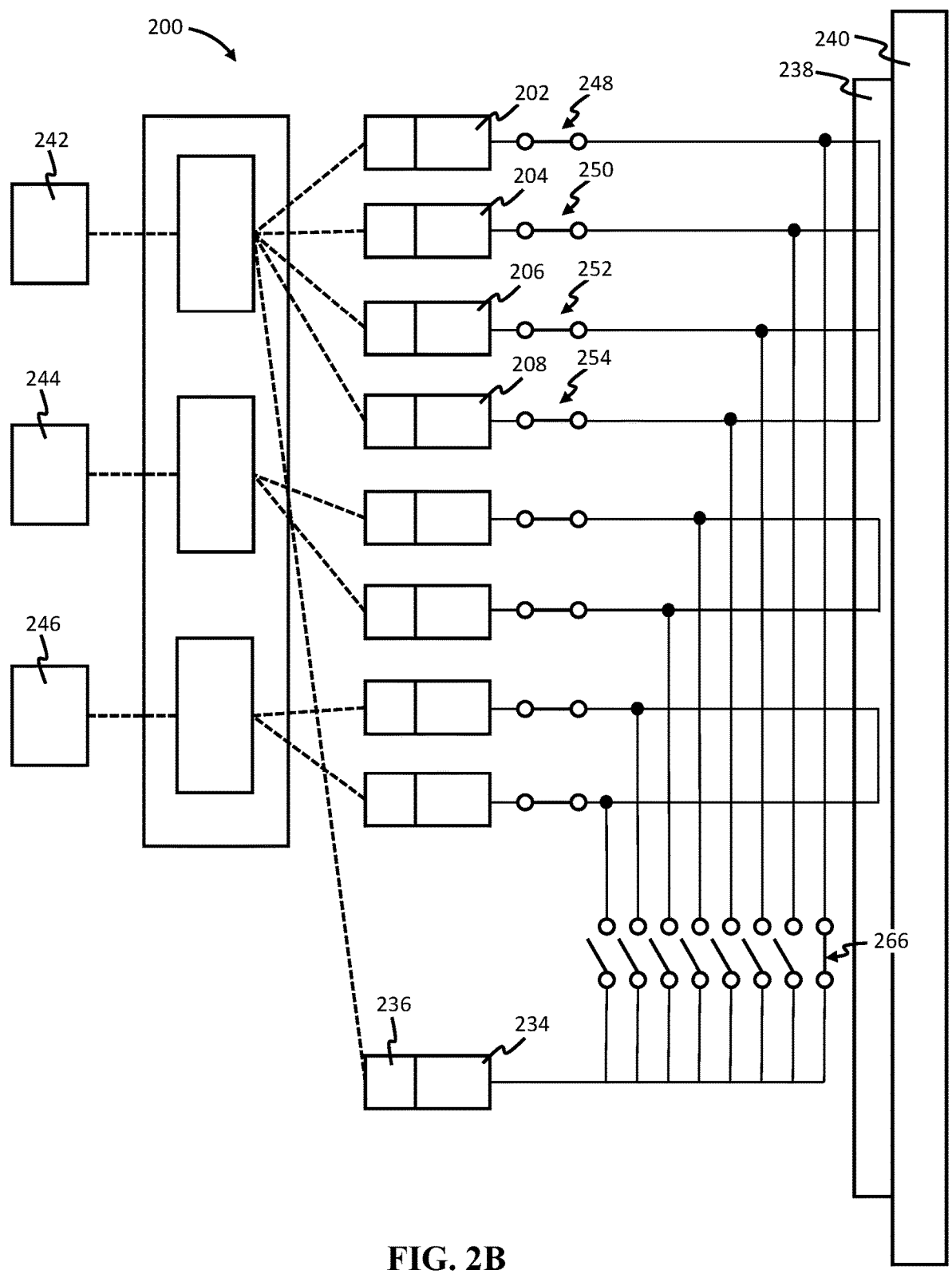
FIG. 2B depicts a second schematic view of a configurable VRM card after the detection of a high-load condition on a first output, in accordance with embodiments of the present disclosure.

For example, FIG. 2B depicts a second schematic view of configurable VRM card 200 after the detection of a high-load condition on the first output. For example, the first output group (stages 202-208) may provide power to a CPU of the external system. In some instances, the external system may predict that the CPU is about to start a demanding workload that may require more power than normal, and may inform VRM card 200 (for example, through a system connector such as conductive contacts 150 and 152). In some instances, VRM card 200 may detect that output group 2 is currently experiencing a transient spike in which it is drawing more current than normal.

In some embodiments, VRM card 200 may detect a high-load condition based on a threshold. Such a threshold may be referred to herein as a high-load threshold. The nature of this high-load threshold may vary based on the embodiment or situation. For example, in some embodiments, VRM card 200 may detect a high-load condition when the current demanded by a system component increases (or is predicted to increase) to such an extent that the VRM card may be unable to provide that current at a sufficiently stable voltage. This type of high-load threshold may be referred to herein as a "stability threshold." A stability threshold may directly compare the current demanded (or predicted) by a component of the system to a current threshold. In this example, if the current demanded (or predicted) is above the current threshold, a high-voltage condition would be detected. In this situation, the current threshold may be established, for example, based on the voltage-stability characteristics of the stages of the output group at various currents. In some embodiments, a stability threshold may alternatively (or additionally) compare the stability of the voltage provided by an output group to a required voltage stability (for example, a voltage stability required by a system component). In this example, if the observed voltage is not within the required stability requirement, a high-voltage condition would be detected.

In some embodiments, VRM card 200 may detect a high-load condition when the current demanded by a system component increases (or is predicted to increase) to such an extent that the VRM card may be unable to provide that current without the stages of the output group operating inefficiently. This type of high-load threshold may be referred to herein as an "efficiency threshold." Like a stability threshold, an efficiency threshold may directly compare the current demanded (or predicted) by a component of the system to a current threshold. In this example, if the current demanded (or predicted) is above the current threshold. In this situation, the current threshold may be established, for example, based on the efficiency characteristics of the stages of the output group at various currents. In some embodiments, an efficiency threshold may alternatively (or additionally) compare the efficiency at which the stages of the output group are operating to a required efficiency (for example, an efficiency in a configuration file on VRM card 200 or required by an operator of the system to which VRM card 200 is connected). In this example, if the observed efficiency is at or above the required efficiency, a high-voltage condition would be detected.

In some embodiments, VRM 200 may employ both a stability threshold and an efficiency threshold simultaneously. In other embodiments, VRM 200 may employ a stability threshold or an efficiency threshold, but not both simultaneously. In some embodiments, VRM 200 may employ a generic high-load threshold that is not directly identifiable as a stability threshold or an efficiency threshold.

Upon detecting a high-load condition on the first output, a configuration selector on VRM card 200 may inform VRM controller 242 to begin transmitting VRM instructions not only to stages 202-208, but also to adaptable spare stage 234. Further, multiplexer circuitry on VRM card 200 may route those VRM instructions from VRM controller 242 to redundancy controller 236 and stage 234. Redundancy controller 236 may then connect adaptable spare stage 234 to a source of power (e.g., by closing a switch between stage 234 and the power source) and connect adaptable spare stage 234 to output group 1 by closing, for example switch 266. This would connect the output of stage 234 to the same output of stage 202, which would therefore connect stage 234 to the first output group. Of note, redundancy controller 236 could also connect stage 234 to the first output group by connecting the output of stage 234 the outputs of any of stages 204-208 by closing the corresponding switches.

Adaptable spare stage 234 may be available to assist with providing power to the first VRM output during the high load condition because VRM 200 is not in need of stage 234 to provide failover current due to a failed stage. However, if a stage in VRM 200 were to fail, adaptable spare stage 234 may be necessary to replace that failed stage.

Figure 2C:
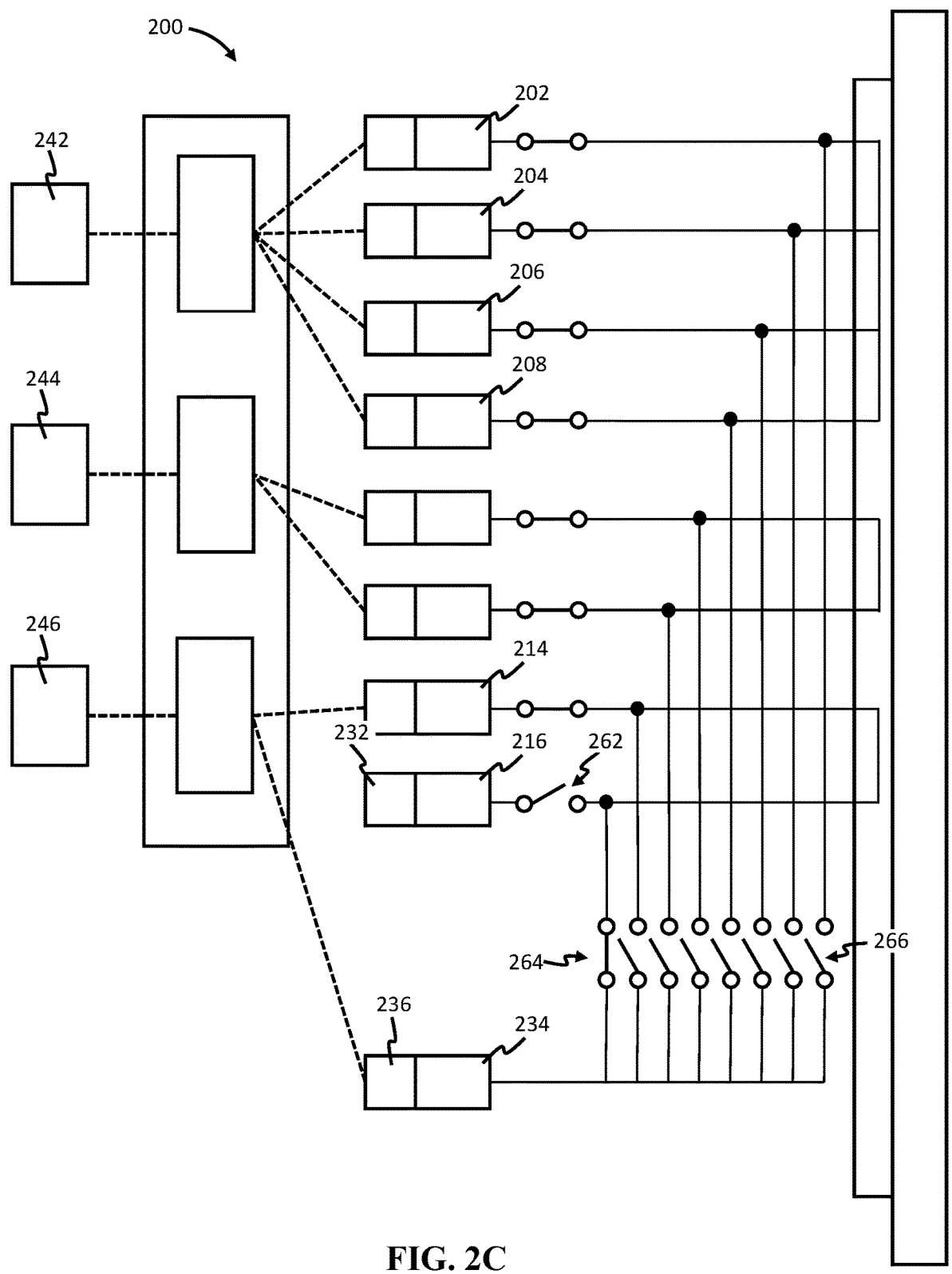
FIG. 2C depicts a third schematic view of a configurable VRM card after the detection of a stage failure on a second output, in accordance with embodiments of the present disclosure.

For example, FIG. 2C depicts a third schematic view of configurable VRM card 200 after the detection of a stage failure on the second output. Specifically, stage 216 in the third output group has failed. The VRM configuration required to power the external system, however, may require that the third output group has 2 stages powering it. The third output group may require 2 stages powering it for several reasons. In some instances, 2 stages may be necessary to provide current at a sufficiently stable voltage (for example, to provide current with a voltage above a stability threshold). In some instances, 2 stages may be necessary to provide current at a sufficiently high efficiency (for example, for the stages of the third output group to operate above an efficiency threshold). In some instances, 2 stages may be necessary to ensure that the third output group had a dedicated spare stage to provide redundancy for the primary stage.

In either case, upon detecting the failure on the third output, VRM card 200 would replace stage 216 with adaptable spare stage 234. To do this, a configuration selector on the card may inform VRM controller 242 that it is no longer providing VRM instructions to stage 234, and multiplexer circuitry on VRM card 200 may stop routing instructions from VRM controller 242 to stage 234 and redundancy controller 236.

In some use cases, the configuration selector may also inform VRM controller 246 that it is no longer providing VRM instructions to stage 216, and that it is instead providing VRM instructions to adaptable spare stage 234. However, because the number of stages to which VRM controller 246 is providing instructions is not changing, the nature of those instructions may also not change. For example, pulse-width-modulation patterns followed by the two stages may be identical regardless of whether the patterns are being relayed to stage 216 or adaptable spare stage 234.

However, multiplexer circuitry on VRM card 200 may stop routing the VRM instructions to stage 216 (and redundancy controller 232). Redundancy controller 232 may then be informed to isolate stage 216 by opening a switch that connects stage 216 to a power source (not depicted in FIG. 2C) and by opening switch 262. This may help to prevent any parasitic effects that may result by having a non-functioning stage connected to the VRM output.

Multiplexer circuitry on VRM card 200 may then also start routing VRM instructions from VRM controller 246 to adaptable spare stage 234 and redundancy controller 236. Redundancy controller 236 would then need to isolate stage 234 from the first output by opening switch 266, and connect stage 234 to the third output group by closing switch 264.

In some instances, removing adaptable spare stage 234 from the first output may negatively affect the first output group's ability to provide sufficient power to that output. For example, if the connected external system component (e.g., a CPU) is still experiencing a high-load condition, the external system component may temporarily be requesting more power than stages 202-208 can reliably provide. In this instance, VRM 200 may inform the external system that the first output group can no longer provide sufficient output to that external system component. This may enable the external system to mitigate the high-load condition to avoid instability of the external system component. This may include, for example, throttling the CPU of the external system. This is discussed in more detail with respect to method 500 in FIG. 5.

Of note, the discussion of FIGS. 2B and 2C provided an example of switching an adaptable stage from the first output group to the third output group due to a stage failure in the third output group. However, the same considerations could also apply if, instead of a stage failure in the third output group, the third output group began to experience (or was predicted to soon experience) a high-load condition. In this situation, stage 216 may still be operational, but the stability or efficiency needs of the third output group may outweigh the stability or efficiency needs of the first output group. In other words, the high-load condition detected in the third output group (assuming that only stages 214-216 were utilized) may be of a higher magnitude than the high-load condition detected for the first output group (assuming that only stages 202-208 were utilized). In this situation, adaptive stage 234 may be switched from the first output group to the third output group in the same manner discussed with respect to FIGS. 2B and 2C.

Also of note, there are some instances in which a VRM controller (or feedback loop within that controller) may fail on a VRM card. In some instances, such a failure may prevent the card from providing VRM instructions to all needed stages for all outputs, and thus the VRM card may need to be replaced. For this reason, some embodiments of the present disclosure also include one or more spare VRM controllers as well as adaptable spare stages.

Figure 3:
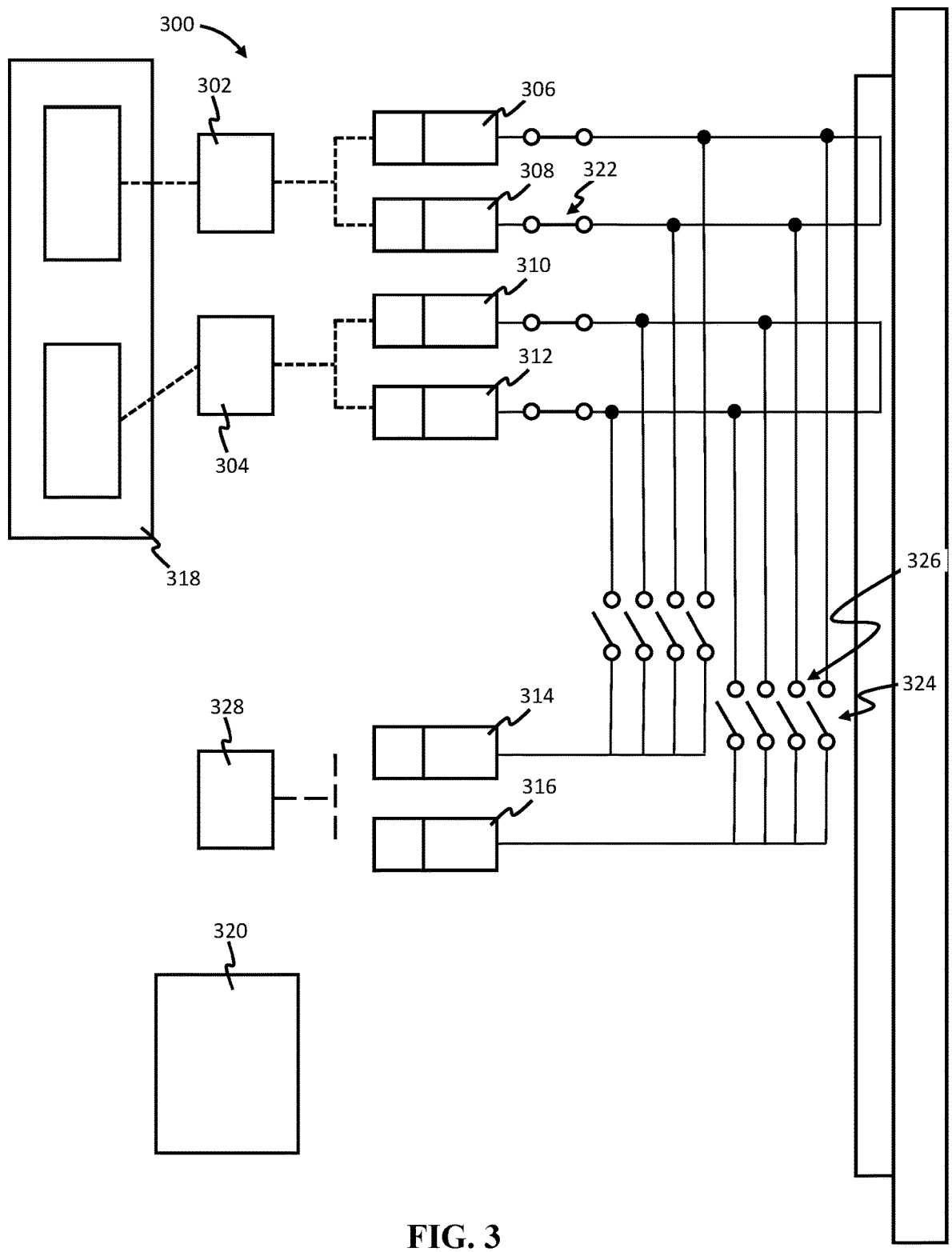
FIG. 3 depicts a schematic view of a configurable VRM card with a spare controller and adaptive spare stages, in accordance with embodiments of the present disclosure.

FIG. 3, for example, depicts a schematic view of a configurable VRM card 300 with a spare controller and adaptive spare stages, in accordance with embodiments of the present disclosure. VRM card 300 includes, as illustrated, VRM controller 302, VRM controller 304, and spare VRM controller 328. VRM controller 302 is currently providing VRM instructions to stages 306 and 308, whereas VRM controller 304 is currently providing VRM instructions to stages 310 and 312. Spare VRM controller 328 is not currently being utilized, and thus is not providing instructions to any stages (illustrated by the incomplete dashed lines exiting VRM controller 328). However, spare VRM controller 328 has the ability to provide instructions to adaptable spare stages 314 and 316.

VRM card 300 also contains multiplexer circuitry 318 and configuration selector 320. Of note, as illustrated in FIG. 3, multiplexer circuitry 318 feeds into VRM controllers 302 and 304, rather than the VRM controllers feeding into the multiplexer circuitry (as illustrated in FIGS. 1A-1C and 2A-2C). This may enable multiplexer circuitry 318 to combine multiple regulation controllers into a single output (for example, if VRM card 300 were providing power to a system with a single output that required all of stages 306-312). This may also enable VRM card 300 to more quickly isolate a failed controller (e.g., VRM controller 302 or 304) that could then be replaced with spare controller 328. Of note, this may also require multiplexer circuitry 318 to control multiplexing switches for VRM controllers 302 and 304. For example, VRM 302, as illustrated in FIG. 3, is routing its VRM instructions to stage 306 and 308. However, if VRM card 300 were inserted into a system that only required 1 output with 4 phases, VRM controller 302 may be required to route its VRM instructions to all of stages 306-312. In this situation, multiplexer circuitry 318 may control multiplexing switches that would cause the VRM instructions from VRM controller 302 to be routed to all four of stages 306-312. Multiplexer circuitry 318 may also control multiplexing switches to isolate VRM controller 308 from stages 306-312.

For example, if VRM controller 302 were to fail, spare VRM controller 328 could be activated to replace it. In this situation, VRM card 300 may also isolate stage 306 and 308, even though they may still be functional, because the VRM controller that was driving them (VRM controller 302) failed. VRM card 300 may then replace stages 306 and 308 with adaptable spare stages 314 and 316. As part of this process, multiplexer circuitry 318 may or may not isolate the failed VRM controller 302 from stages 306 and 308 as a precautionary measure, even though stages 306 and 308 have been isolated from the output of VRM card 300. Spare VRM controller 328 may then obtain VRM instructions (e.g., from a configuration file) from configuration selector 320. VRM card 300 may then close the appropriate output switches to connect stages 314 and 316 to the appropriate output to replace stages 306 and 308 (e.g., switch 324 for stage 316).

Of note, adaptable spare stages 314 and 316 could, in some embodiments, provide stage redundancy to VRM card 300 even in the absence of the failure of a VRM controller. For example, if stage 308 failed, VRM card 300 could isolate stage 308 from the card's output by opening switch 322. Spare adaptable stage 316 could then be connected to the output to replace stage 308 by closing either of switches 324 or 326. In some embodiments, multiplexer circuitry 318 could then adjust the multiplexing switches for VRM controller 302. This adjustment could cause the VRM instructions from VRM controller 302 to no longer be routed to stage 308. In some embodiments, VRM controller 302 may be capable of routing instructions to adaptable stages spare stage 314 and 316. In those embodiments, multiplexer circuitry 318 could also adjust a multiplexing switch to cause the VRM instructions from VRM controller 302 that were previously being routed to stage 308 to be re-routed to stage 316, for example. In this example, VRM controller 302 may not need updated VRM confirmation instructions, and may be oblivious to the change.

In some embodiments, however, VRM controllers 302 and 304 may not be capable of routing VRM instructions to spare adaptable stages 314 or 316. This may be, for example, due to complications with respect to routing wiring between each VRM controller and the spare adaptable stages. It could also be, for example, to due the space that would be necessary to provide multiplexer switches that would be sufficient to multiplexer circuitry 318 to select any stage, including spare adaptive stages 314 and 316, to route VRM instructions to from VRM controllers 302 and 304. Regardless of the reason, in these embodiments, a failure of stage 308, for example, may require replacing VRM controller 302 with spare VRM controller 328, even though VRM controller 302 may be functional. In this situation, VRM card 300 may isolate VRM controller 302 and stages 306 and 308. VRM card 300 may then VRM instructions to VRM controller 328 and connect both stages 314 and 316 to the first output of the VRM card.

In another example, if stage 308 were to fail but VRM instructions from VRM 302 could not be routed to spare adaptive stages 314 or 316, VRM card 300 may replace stage 308 by activating VRM controller 328 and one of spare adaptive stages 314 and 316. For example, by opening switch 322 and closing switch 326, stage 308 would be isolated from and stage 316 would be connected to the first output. Further, by updating the multiplexing switches for VRM controller 302, multiplexing circuitry 318 could cause VRM instructions from VRM controller 302 to be routed only to stage 306 rather than both stages 306 and 308. VRM controller 302 may then obtain updated VRM instructions from configuration selector 320 to reflect the fact that VRM controller would now only be providing VRM instructions to a single stage. VRM controller 328 could then also receive VRM instructions from configuration selector 320 that would reflect the fact that VRM controller 328 would only be providing VRM instructions to a single stage.

Figure 4:
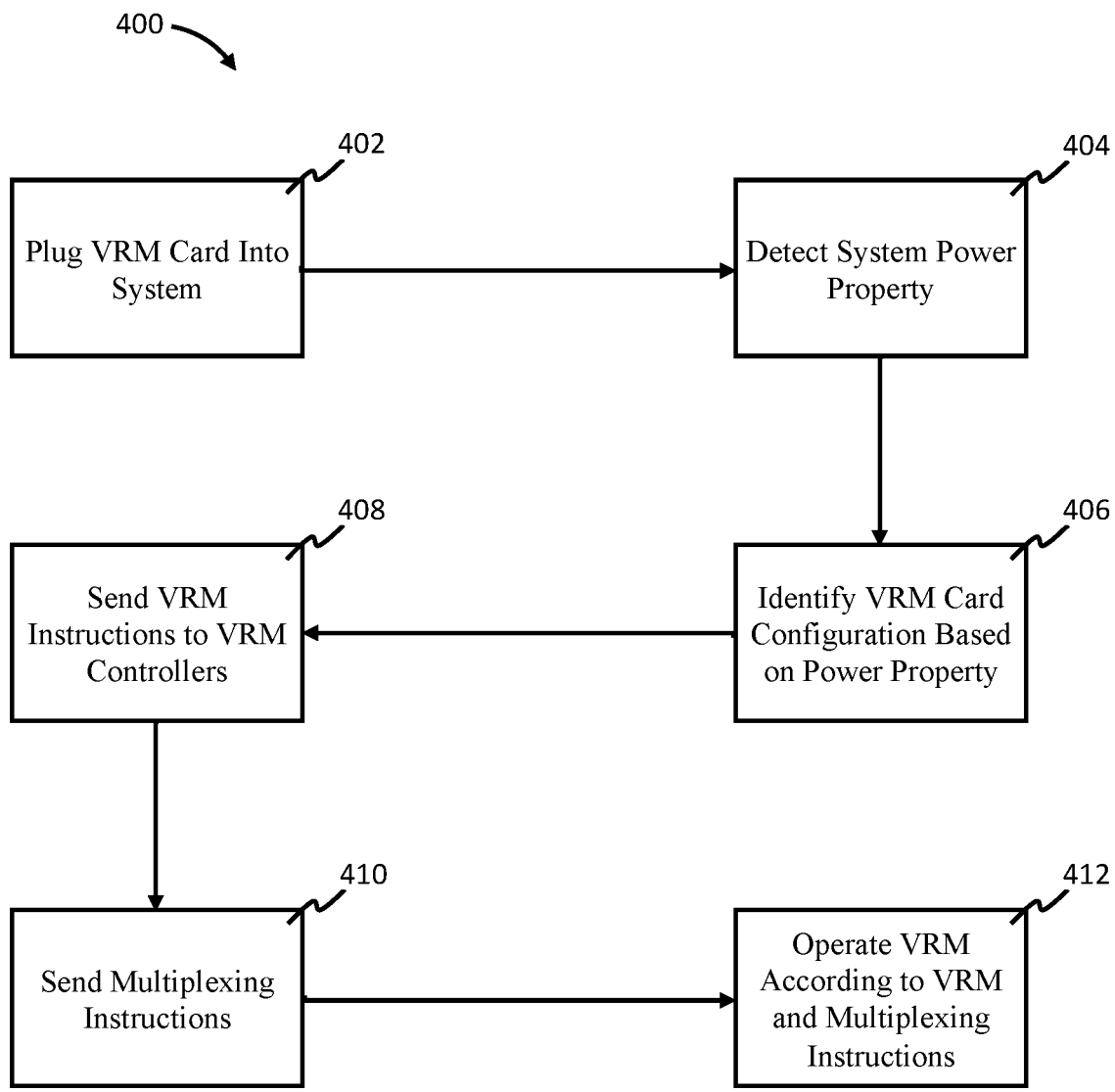
FIG. 4 depicts a method of using a configurable discrete VRM card, in accordance with embodiments of the present disclosure.

FIG. 4 depicts a method 400 of using a configurable discrete VRM card, in accordance with embodiments of the present disclosure. Method 400 could be performed, for example, using VRM card 100 of FIGS. 1A through 1C, VRM card 200 of FIGS. 2A-2C or VRM card 300 of FIG. 3.

Method 400 begins in block 402, in which the VRM card is plugged into a system designed to receive power from the VRM card. Upon being plugged into the system, the VRM card detects a power property of the system in block 404. A power property, as used herein, may refer to a power requirement of the system (e.g., number of outputs, voltage ranges of those outputs), a system identifier (e.g., a model number, a serial number), or an identification of a power configuration number (e.g., a binary code, configuration 5) This detection could occur in several ways, depending on how the VRM card and the system are designed to communicate.

For example, a conductive contact on the VRM card connector (e.g., a contact on a card-edge connector of the VRM card) could complete a circuit with a contact on the system board. The voltage or current running through that circuit may be, in some embodiments, indicative of the system power property. In these embodiments, a configuration selector on the VRM card may read the voltage or current flowing through that circuit to determine the power property. For example, if a VRM card is designed to provide power to three different products with three different power requirements, each of those products may form a circuit with the configuration selector in a different voltage range. One of those products may be designed to form a circuit containing voltage between 0 and 3 volts, a second of those products may be designed to form a circuit containing voltage between 5 and 8 volts, and a third of those products may be designed to form a circuit containing voltage between 10 and 13 volts. In this example, whether the system is the first, second, or third product may be the system power property, which may be identifiable by the configuration selector by identifying the voltage range of the circuit formed with the product.

In another example, conductive contacts on the VRM card connector could contact a set of pins on the system board (or in a slot mounted on the system board). A configuration selector could identify a system power property by determining which of those pins is connected to a circuit through which a voltage exists (i.e., in which pins a voltage is detected). That determination could be used to formulate a code that could then be used to identify the power requirements of the system. Either this code or the power requirements could be referred to as the power property, in this example. For example, a VRM card connector could contact a set of four pins on the system board. The configuration selector could determine that the first and third pins in the set have a measurable in them, resulting in a code of "1010." In some embodiments, this code could be cross referenced against a table that correlates the code with system power requirements (or VRM configurations). In other embodiments, the voltage of the pins could be connected to a series of logic gates that could be used to set the output of the configuration selector. With a set of four pins, there would be 16 possible combinations of codes, giving a potential of 16 possible output configurations.

In another example, conductive contacts on the VRM card connector could form a connection between the configuration selector on the card and a memory on the system board. If the configuration selector took the form of a microprocessor, the configuration selector could then request and process a variety of information from that memory that could serve as the system's power property. For example, the configuration selector could request the serial number of the system, the model number of the system, the number of outputs required to be powered by the VRM card, voltage ranges of the components on the board, a VRM-card configuration number that corresponds to the system's power needs, and others. The configuration selector could then analyze this information to determine the power requirements of the system.

In another example, the VRM card connector may not include any contacts that are dedicated to gathering information regarding the computer system to which the VRM card is connected. Rather, the configuration selector could analyze the connections formed between the power stages of the VRM card connector and the computer system. For example, a VRM card may have 16 contacts on a card-edge connector, each of which may be specific to one of 16 primary power stages on the VRM card. A configuration selector could perform impedance measurements between each contact to determine which of the contacts are connected to the same components. If, for example, the first four contacts were connected to the same set of memory modules, very little impedance would exist between those four contacts. Similarly, if contacts 5-10 and contacts 11-16 were both connected to separate processors, very little impedance would be measured between any of contacts 5-10 and any of contacts 11-16. However, a comparatively greater impedance would likely be measured between a contact of one of these ranges and a contact of another of these ranges (e.g., between 3 and 6, 8 and 13, 4 and 12). Thus, by measuring these impedance values, the configuration selector could identify the number of outputs needed by the system (in this example, 3) and the number of power stages for each (in this example, 4, 6, and 6). These numbers could be used as the system power property.

Regardless of how the system power property is detected in block 404, the system power property could be used in block 406 to identify a configuration of the VRM card that would be necessary to meet the system's power requirements. This may include, for example, selecting one of a limited number of pre-determined configurations of the VRM card. For example, if the power property detected in block 404 identifies the computer system as one of two products that the VRM is designed to power, block 406 may include identifying the power configuration that corresponds to that product. This may be as simple as causing a configuration selector to select one of two outputs based on whether the system power property is high (i.e., an "on" input) or low (i.e., an "off" input). In other embodiments, block 406 may include cross referencing a binary code, serial number, or model number with a table in memory on the VRM card that that correlates those numbers with VRM card configuration numbers.

Once the configuration selector identifies the VRM card configuration in block 406, the configuration selector can send, in block 408, VRM instructions to a set of VRM controllers based on that identified configuration. The format of these VRM instructions may differ based on the embodiment of the VRM card. For example, in some embodiments, the VRM instructions may comprise a voltage target, power-stage assignments, VRM instructions, etc.

For example, a configuration selector may output a voltage that falls within one of a set of pre-defined voltage ranges to the VRM controllers. The VRM controller may detect that voltage and, based on the pre-defined voltage range in which the voltage falls, fetch a configuration file from a memory module on the VRM card. In this example, the VRM instructions sent to the VRM controllers takes the form of a voltage that would instruct the VRM controllers to fetch a particular configuration file.

Similarly, a configuration selector could also output a series of voltages that could be interpreted as a configuration code. For example, the configuration selector could output two pulses of power at a particular voltage, either simultaneously or in series, that each fall within one of three voltage ranges (e.g., ranges A, B, and C). Receiving a first signal in the second range (e.g., range B) and a second signal in the first range (e.g., range A) could inform a VRM controller to fetch a configuration file that corresponds to configuration "BA," whereas receiving a first signal in the third range and a second signal in the third range could instruct a VRM controller to fetch a configuration file that corresponds to configuration "CC." These configuration files may inform the VRM controllers which power stages each VRM controller is controlling and the target voltage range.

As another example, a more complex configuration selector (e.g., an ASIC or microprocessor) could, in response to identifying the VRM card configuration in block 406, fetch a corresponding configuration file from a memory module and forward VRM instructions to the VRM controllers based on those instructions. In some such embodiments, these VRM instructions may simply be the fetched configuration file. In other embodiments, the configuration selector may send specific instructions to each VRM controller or feedback loop. For example, the configuration selector may send instructions to a feedback loop of a first controller to keep the total output within voltage range 1, and may send instructions to a feedback loop of a second controller to keep the total output within voltage range 2.

Once the configuration selector identifies the VRM card configuration in block 406, the configuration selector can send, in block 410, multiplexing instructions to multiplexing circuitry logic on the VRM card. Similar to the VRM instructions sent in block 408, the form of these multiplexing instructions may vary based on the implementation of the VRM card. For example, in some embodiments the configuration selector could send, to the multiplexing circuitry logic, a signal of a particular voltage (e.g., high or low). That signal could be provided as the input that could cause the multiplexing circuitry logic to "select" a set of outputs (e.g., a cluster of signals) for each VRM controller. Each output in that set of outputs may correspond to a power stage to which that VRM controller's VRM instructions will be routed. For example, a signal of 10V may cause the multiplexing circuitry logic to connect an output of a VRM card's first VRM controller to the first four stages of the VRM card and to connect an output of the VRM card's second VRM controller to the fifth and sixth stages of the VRM card. This embodiment may be beneficial, for example, when the number of potential configurations for a VRM card is low and can be identified in advance.

In another embodiment, the configuration selector may output a separate signal to the multiplexing circuitry logic for each output group of the VRM card, or even each stage of the VRM card. This could be accomplished by an analog voltage programmable selection mechanism. For example, the configuration selector may output a 2V signal to a set of 6 multiplexer switches that route the input of the stages 1-6.

This 2V signal may cause those 6 multiplexer switches to connect the output of the first VRM controller to the corresponding stage for each switch (e.g., stage 1 for the first multiplexer switch, stage 2 for the second multiplexer switch, etc.). However, if that configuration selector had output a 5V signal to those 6 multiplexer switches, the multiplexer switches may have connected the output of the second VRM controller, rather than the first VRM controller, to those stages. Of note, rather than sending a single 2V signal (or 5V signal) to those 6 multiplexer switches, the configuration selector could also send six separate 2V signals (or six separate 5V signals), such that each multiplexer switch would be sent a separate, dedicated signal.

Another example VRM card may have four VRM controllers, eight primary stages, and two adaptive spare stages. In this example, multiplexer circuitry on the VRM card may include a multiplexer switch for each of the eight primary stages and two adaptive stages. Each of those ten multiplexer switches may have five possible states: a first state may connect the corresponding stage to the first VRM controller, the second state may connect the corresponding stage to the second VRM controller, the third state may connect the corresponding stage to the third VRM controller, the fourth state may connect the corresponding stage to the fourth VRM controller, and the fifth state may isolate the corresponding stage from all VRM controllers.

In this example VRM card, the first output (i.e., the first VRM controller) may be selected by one of the ten multiplexer switches when receiving a signal between 0V and 1.4V, the second output (i.e., the second VRM controller) may be selected when receiving a signal between 1.5V and 2.9V, the third output (i.e., the third VRM controller) may be selected when receiving a signal between 3.0V and 4.4V, the fourth output (i.e., the fourth VRM controller) may be selected when receiving a signal between 4.5V and 5.9V, and the fifth output (i.e., the fifth VRM controller) may be selected when receiving a signal between 6.0V and 7.4V.

This embodiment may be beneficial, for example, when the number of potential configurations for a VRM card is high, or when those configurations cannot be determined in advance.

By updated the voltages sent to the multiplexer circuitry in block 410 when the configuration selector detects the system power property in block 404 (or identifies the VRM card configuration in block 406), new combinations of power stages could be created, enabling the outputs of the VRM card to be updated and customized.

Once the configuration selector sends the VRM instructions in block 408 and the multiplexing instructions in block 410, the VRM controllers and power stages should be ready to operate together and output power that meets the voltage requirements of the system into which the VRM card was plugged in block 402. Thus, the VRM card may then be operated according to the VRM instructions and multiplexing instructions in block 412.

Figure 5:
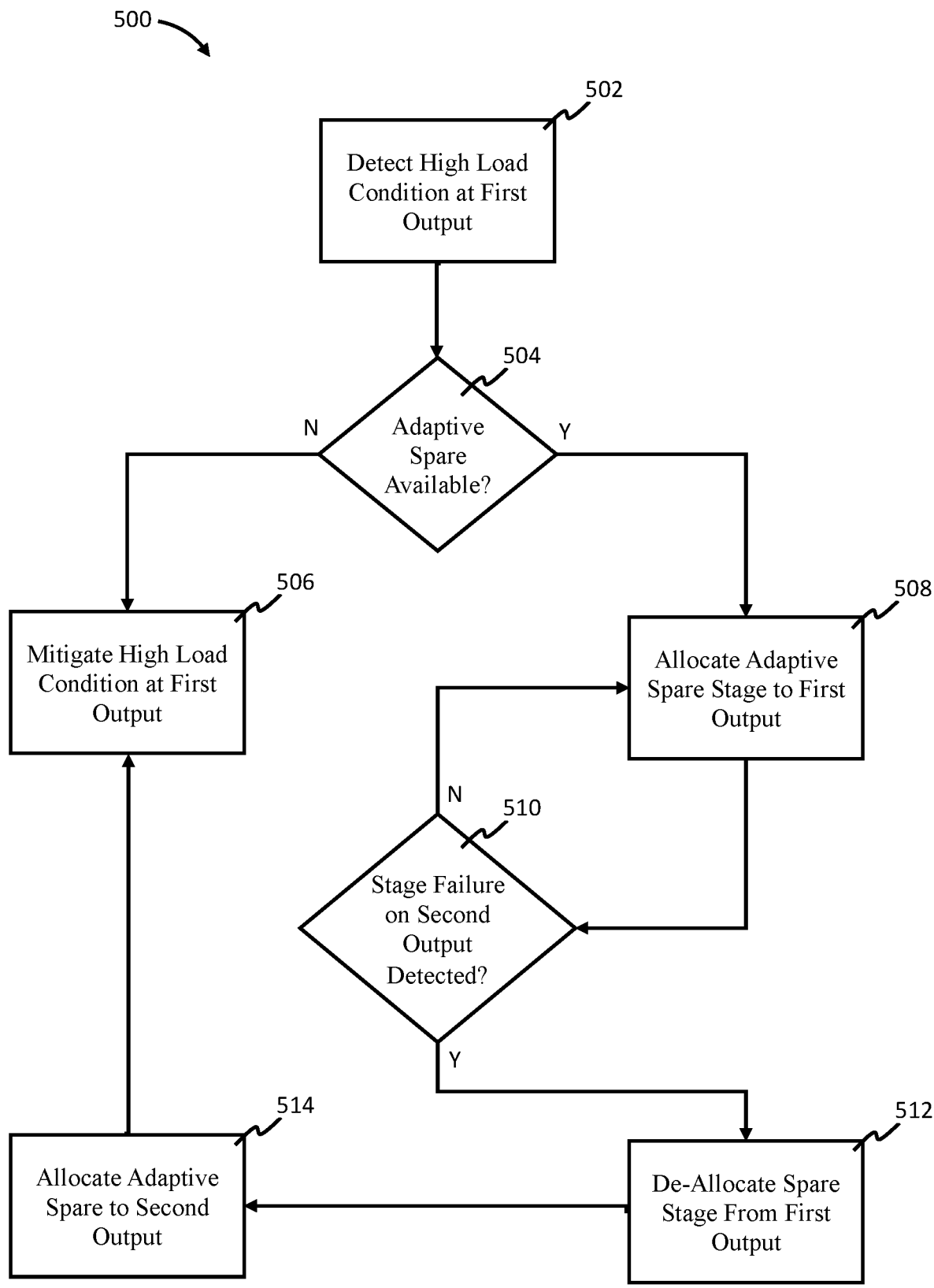
FIG. 5 depicts a method of responding to a high-load condition using a configurable discrete VRM card, in accordance with embodiments of the present disclosure.

FIG. 5 depicts a method of responding to a high-load condition using a configurable discrete VRM card, in accordance with embodiments of the present disclosure. Method 500 may be performed, for example, by a component on a VRM (e.g., a configuration selector, control logic, multiplexer circuitry, or VRM controller).

Method 500 begins in block 502, in which a high load condition is detected on a first output of the VRM card. Detecting a high-load condition may include detecting an immediate need for, for example, a higher amount of current, or predicting high likelihood of a future need for that current.

For example, block 502 may include monitoring the activity of the VRM card's outputs for output patterns. This may include, for example, monitoring the outputs of the VRM card's individual stages or of the VRM card's combined outputs after the outputs of those stages have been connected. In some instances, a drop in voltage (either sudden or gradual and continuous) at a first VRM output may indicate an increased demand for current by the corresponding system component that is connected to the first output. This may indicate to the VRM card that corresponding system component corresponding is experiencing a high-load condition.

In some embodiments, block 502 may be informed by the external system to which the VRM card is connected. For example, through a system connector (e.g., conductive contacts 150 and 152), the external system may be capable of informing the VRM card that a component that is connected to the first VRM output is experiencing a high load condition or is predicted to experience a high-load condition. For example, a CPU of the external system that is connected to the first output may be beginning a complex simulation that requires an unusually high amount of current, or a GPU of the external system that is connected to the first output may be scheduled to perform a complex rendering task in 30 seconds. In these examples, the CPU or GPU could signal the VRM card to inform the VRM card of the impending need for additional current on the output that powers that CPU or GPU. In these situations, detecting the high load condition in the first output may include receiving and processing the information received by the external system.

In some embodiments, block 502 may also include more complex analysis of VRM and system activity. For example, block 502 may include measuring the current drawn by the component over time and detecting patterns that might indicate repeated periodic high load conditions or analyzing a future duty schedule of the component (e.g., planned updates and workloads). In some embodiments, block 502 may utilize the computer system's CPU, or a machine-learning model that is trained to associate patterns in the component's usage with future high load conditions. The system CPU could also signal the VRM card about an impending need for additional current on a specific output, allowing the VRM card to switch in additional phases to meet that impending need.

In some embodiments, detecting a high-load condition in block 502 may include utilizing one or more high-load thresholds. Such a high-load threshold may take the form of a stability threshold, an efficiency threshold, or both. In some embodiments, the observed voltage stability of one output group may be compared to the observed stability of another output group. This may have several benefits. For example, this may enable a VRM system to identify the output group that is experiencing the high-load condition of the highest magnitude. For example, a first output group may only be able to output current with a 90% voltage consistency. While this may normally be sufficient to trigger a high-load condition, a second output group may only be able to output current with an 85% voltage consistency. In this scenario, block 502 may only identify a high-load condition at the second output group.

In some instances, block 502 may include identifying a high-load condition for multiple output groups (i.e., identify more than one output group that is experiencing a high-load condition). In some of these instances, there may be a sufficient number of adaptive spare stages to address the high-load conditions for each output group (for example, there may be at least one adaptive spare stage to switch in for each output group that is experiencing a high-load condition). In these instances, the component performing method 500 may effectively perform the remainder of method 500 for each of those output groups.

However, in some instances there is an insufficient number of adaptive spare stages to address the high-load condition comparing high-load conditions in multiple output groups. In these instances, detecting a high-load condition at block 502 may account for the number of stages and operating current at those output groups. For example, a configurable VRM card may determine that 8 stages operating at 60% efficiency may actually lead to more power loss than 2 stages operating at 57% efficiency. In this scenario, block 502 may only identify a high-load condition for the 8 stages. In another example, a configurable VRM card may determine that 4 stages that are providing very high current at 60% efficiency may actually lead to more power loss than 4 stages that are providing very low current at 57% efficiency.

Of note, assigning and reassigning adaptive spare stages among output groups based on the relative magnitude of high-load conditions at those output groups may have further benefits. For example, in some instances this practice may decrease the difference between the operating voltages of the stages of each output group. This may be particularly beneficial when an adaptive spare stage switches between one of those output groups. For example, if an adaptive spare stage switches from a first output group to a second output group, the converter of the adaptive spare stage must typically adjust its operating voltage to match the operating voltage of the second output group before effectively contributing to the output. If the operating voltage of the first output group and the second output group are similar, the time required for this voltage matching may be reduced, lowering the effective switching time from the first output group to the second output group.

Upon detecting, in block 502, a high-load condition at the first VRM card output, method 500 proceeds to block 504 in which the VRM card determines whether an adaptive spare converter is available to add to the first output group to support the high-load condition. Using VRM 300 from FIG. 3 as an example, the first output (e.g., the output to which stages 306 and 308 are connected) may be predicted to experience a high load condition in the imminent future, and thus stages 306 and 308 may require one or more added stages to support the high-load condition. Control-logic circuitry on VRM 300 may analyze, in block 504, whether adaptable spare stages 314 and 316 are available to be temporarily connected to the first output.

An adaptive spare stage may be unavailable to assist with the high-load condition on the first output for several reasons. For example, the adaptive spare stage may have failed, in which case it would be unable to provide power either to assist with a high-load condition or for redundancy. Similarly, an adaptive spare stage may have been switched in to replace a primary stage that had failed. If the adaptive spare stage has already replaced a failed primary stage in another output (e.g., a second VRM output), using the adaptive spare stage to assist with the high-load condition at the first output may prevent the "another" output from functioning sufficiently. If, on the other hand, the adaptive spare stage has already replaced a failed primary stage at the first output, the adaptive spare stage would already be contributing to the first output and thus could not be used to add to the power at the first output.

In another example, an adaptive spare stage may be unavailable because it may be switched in to a second output to assist with a more important high-load condition at that output. For example, failing to provide sufficient power for the high-load condition at the first output that is detected in block 502 may result in an external system component functioning less efficiently (e.g., performance of a GPU may decrease, and thus a render task may take longer). Block 504 may determine that an adaptive spare stage is already being utilized in a second output to provide power for a high-load condition for an external system's CPU. Further, failing to provide sufficient power for the external system's CPU may cause the system to crash. Thus, in this example, block 504 may determine that the adaptive spare stage would be unavailable to assist with the high-load condition detected in block 502.

In a related example, the high-load condition detected in block 502 may be more critical that a second high-load condition for which an adaptive spare stage is already allocated. For example, failing to provide sufficient power for the high-load condition detected in block 502 may cause the external system to crash, whereas failing to provide sufficient power for the other high-load condition may result in an external system component functioning less efficiently. In this example, block 504 may determine that the adaptive spare stage would be available to assist with the high-load condition detected in block 502

If the VRM card determines, in block 504, that no adaptive spare stage is available, the VRM card proceeds to block 506 in which the high load condition at the first output is mitigated. Block 506 may include informing the external system that the VRM card cannot supply sufficient power for the detected high-load condition, and the external system may determine the appropriate solution (e.g., throttling system components).

If, on the other hand, the VRM card determines at block 504 that an adaptive spare stage is available, the VRM card allocates the adaptive spare stage to the first output in block 508. In some instances, this allocation may include switching in an adaptive spare stage that was previously not providing power to an output, as discussed with respect to FIG. 2B. In other instances, this allocation may include first disconnecting the adaptive spare stage from a different output (e.g., the VRM card's second output) before connecting it to the first output, as discussed with respect to FIG. 2C.

Allocating the adaptive spare stage in block 508 may allow the VRM card to supply the necessary power to occasional high load conditions without requiring the added expense of designing and manufacturing the VRM card with even more primary converters (or dedicated spare converters) for that first output. In some embodiments, this method may also be utilized to allow a computer component to boost to a steady-state performance above that which would be possible with the primary converters supporting that component.

However, in some instances the adaptive spare stage that is allocated to the first output may be needed to provide redundancy for stage failure. Thus, the VRM card operating method 500 determines, in block 510, whether a stage has failed on a second output (or any other output besides the first output). If the VRM card determines that no stage has failed on the second output, the VRM card continues to leave the adaptive spare stage allocated to the first output in block 508. In some embodiments, blocks 508 and 510 may cycle continuously (e.g., once every millisecond) until a stage failure is detected in block 510, or until the adaptive spare stage is otherwise no longer allocated to assist with the high-load condition at the first output.

However, if the VRM card determines that a stage has failed on the second output, the VRM card proceeds to de-allocate the spare stage in block 512. This may resemble the de-allocation of adaptive spare stage 234 from the first output in FIG. 2C. Also similar to FIG. 2C, in some instances the detection in 510 may not actually be a stage failure in another output group, but may rather be a high-load condition that is of a higher magnitude than the high-load condition that was detected in block 502. In these instances, method 500 may proceed in the same way as if a stage failure were detected in block 510.

Of note, in VRM cards that contain only a single adaptive spare stage, the de-allocate the adaptive spare stage in block 512 may be automatic after the detection of the failed stage in block 510. However, in VRM cards that contain multiple adaptive spare stages, block 510 may also, after detecting a failure of a stage on a second output, determine whether those other adaptive spare stages (i.e., adaptive spare stages other than the adaptive spare stage that was allocated at block 508) are available to replace the failed stage.

In some embodiments, this added availability determination may resemble the determination at 504 for those other adaptive spare stages. If the VRM card determines that additional adaptive spare stages are available, those adaptive spare stages may be utilized to replace the failed stage in the second output, and the VRM card may again return to block 508. However, if the VRM card determines that no additional adaptive spare stages are available, the VRM card would proceed to de-allocate the spare stage from the first output in block 512.

Upon de-allocating the adaptive spare stage from the first output in block 512, the VRM card allocates the adaptive spare stage to the second output in block 514 to replace the failed stage. This allocation may resemble the allocation of adaptive spare stage 234 to the third output in FIG. 2C.

The looping of blocks 508 and 510, followed by the de-allocation and allocation of the adaptive spare in blocks 512 and 514 when necessary, may enable the VRM card to utilize an adaptive spare stage to assist with high-load conditions when available, but to still provide adaptive redundancy for stage failure when necessary.

For example, the external-system component connected to the first output in FIG. 1B (illustrated by dashed outline 186) may be capable of operating at higher performance when supported by six power stages rather than four. In this example, adaptable spare stages 174 and 176 may be added to the first output group during regular operations of the computer system. However, if, for example, stages 110 and 116 both fail, both adaptable spare stages 174 and 176 may be necessary to support the second and third VRM outputs. In this case, adaptable spare stage 174 may be disconnected from the first output and connected to the second output, and adaptable spare stage 176 may be disconnected from the first output and connected to the third output.

Upon de-allocating the adaptive spare from the first output in block 512, the VRM card may be unable to provide sufficient power to support the high-load condition at the first output that was detected in block 502. Thus, upon performing blocks 512 and 514 (or simultaneously with block 512 or block 514), the VRM card proceeds to block 506, in which the high-load condition at the first output can be mitigated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A discrete voltage regulation module (VRM) card comprising:
   a first VRM controller and a second VRM controller;
   a first primary power stage;
   a second primary power stage;
   an adaptable spare stage;
   a first switch, wherein closing the first switch connects the adaptable spare stage with an output of the first primary power stage; and
   a second switch, wherein closing the second switch connects the adaptable spare stage an output of the second primary power stage.

2. The discrete VRM card of claim 1, further comprising:
   multiplexer circuitry, wherein a first state of the multiplexer circuitry routes VRM instructions from the first VRM controller to the first primary power stage and a second state of the multiplexer circuitry routes VRM instructions from the second VRM controller to the first primary power stage.

3. The discrete VRM card of claim 2, further comprising:
   a configuration selector, wherein the configuration selector provides multiplexing instructions to the multiplexer circuitry.

4. The discrete VRM card of claim 1, further comprising:
   a configuration selector, wherein the configuration selector is configured to provide VRM instructions to the VRM controller.

5. The discrete VRM card of claim 4, wherein the VRM instructions comprise a signal that identifies a configuration file.

6. The discrete VRM card of claim 4, wherein the configuration selector is configured to receive a system power property from a computer system with which the discrete VRM card is connected, and wherein the VRM instructions are based on the system power property.

7. The discrete VRM card of claim 6, wherein the power property comprises a voltage signal within a pre-determined voltage range.

8. The discrete VRM card of claim 1, further comprising a third VRM controller, wherein the third VRM controller is configured as a spare VRM controller that has the ability to provide instructions to the first adaptable spare stage.

9. A method of operating a discrete voltage regulation module (VRM) card, the method comprising:
   detecting, by the VRM card, that the VRM card has been connected to an external system;
   detecting, by the VRM card, a power property of the external system;
   identifying, by the VRM card, a VRM card configuration based on the power property;
   sending, by the VRM card and based on the identifying, VRM instructions to a set of VRM controllers on the VRM card;
   sending, by the VRM card and based on the identifying, multiplexing instructions to multiplexer circuitry on the VRM card; and
   operating the VRM card according to the VRM instructions and multiplexing instructions.

10. The method of claim 9, wherein the method further comprises:
    detecting, by the VRM card, a high-load condition at a first output of the VRM card;

determining, by the VRM card, that an adaptive spare stage is available; and allocating, by the VRM card, the adaptive spare stage to the first output.

11. The method of claim 10, wherein the method further comprises:

detecting, by the VRM card, a failure of a first stage on a second output of the VRM card;

de-allocating, by the VRM card, the adaptive spare stage from the first output; and allocating, by the VRM card, the adaptive spare stage to the second output.

12. The method of claim 11, wherein the de-allocating comprises opening a first switch that connects the adaptive spare stage to the first output and wherein the allocating the adaptive spare stage to the second output comprises closing a second switch that connects the adaptive spare stage to the second output.

13. The method of claim 10, wherein the method further comprises:

closing, by the VRM card, a first switch that connects the connects the adaptive spare stage to the first output;

sending, by the VRM card, updated multiplexing instructions to the multiplexer circuitry; and routing, by the VRM card and based on the multiplexing instructions, VRM instructions from a first VRM controller in the set of VRM controllers to the adaptive spare stage.

14. The method of claim 9, wherein detecting the power property comprises performing impedance measurements on a set of contacts that form a connection between a set of power stages on the VRM card and a set of components in the computer system.

15. The method of claim 9, wherein the method further comprises:

detecting, by the VRM card, a failure a first VRM controller in the set of VRM controllers;

sending, by the VRM card and based on detecting the failure, VRM instructions to a spare VRM controller on the VRM card; and sending, by the VRM card and based on the failure, updated multiplexing instructions to multiplexer circuitry on the VRM card, wherein the updated multiplexing instructions cause the spare VRM controller to provide VRM instructions to a stage on the VRM card.

16. A voltage regulation module (VRM) system comprising control-logic circuitry configured to perform a method, the method comprising:

detecting, by the VRM card, that the VRM card has been connected to an external system;

detecting, by the VRM card, a power property of the computer system;

identifying, by the VRM card, a VRM card configuration based on the power property;

sending, by the VRM card and based on the identifying, VRM instructions to a set of VRM controllers on the VRM card;

sending, by the VRM card and based on the identifying, multiplexing instructions to multiplexer circuitry on the VRM card; and operating the VRM card according to the VRM instructions and multiplexing instructions.

17. The VRM system of claim 16, wherein the method performed by the VRM system further comprises:

detecting, by the VRM card, a high-load condition at a first output of the VRM card;

determining, by the VRM card, that an adaptive spare stage is available; and allocating, by the VRM card, the adaptive spare stage to the first output.

18. The VRM system of claim 17, wherein the method performed by the VRM system further comprises:

detecting, by the VRM card, a failure of a first stage on a second output of the VRM card;

de-allocating, by the VRM card, the adaptive spare stage from the first output; and allocating, by the VRM card, the adaptive spare stage to the second output.

19. The VRM system of claim 16, wherein the method performed by the VRM system further comprises performing impedance measurements on a set of contacts that form a connection between a set of power stages on the VRM card and a set of components in the computer system.

20. The VRM system of claim 17, wherein the method performed by the VRM system further comprises:

detecting, by the VRM card, a failure a first VRM controller in the set of VRM controllers;

sending, by the VRM card and based on detecting the failure, VRM instructions to a spare VRM controller on the VRM card; and sending, by the VRM card and based on the failure, updated multiplexing instructions to multiplexer circuitry on the VRM card, wherein the updated multiplexing instructions cause the spare VRM controller to provide VRM instructions to a stage on the VRM card.

* * * * *